United States Patent
Tsuboi et al.

(10) Patent No.: US 9,534,592 B2
(45) Date of Patent: Jan. 3, 2017

(54) ACTUATOR, MICROPUMP, AND ELECTRONIC EQUIPMENT

(71) Applicant: FUJITSU LIMITED, Kawasaki-shi, Kanagawa (JP)

(72) Inventors: Osamu Tsuboi, Kawasaki (JP); Yoshihiro Mizuno, Kobe (JP); Norinao Kouma, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 455 days.

(21) Appl. No.: 13/953,270

(22) Filed: Jul. 29, 2013

(65) Prior Publication Data

US 2013/0315757 A1 Nov. 28, 2013

Related U.S. Application Data

(63) Continuation of application No. PCT/JP2011/054039, filed on Feb. 23, 2011.

(51) Int. Cl.
*F04B 43/04* (2006.01)
*H01H 37/58* (2006.01)
(Continued)

(52) U.S. Cl.
CPC ............. *F04B 43/043* (2013.01); *F03G 7/06* (2013.01); *F04B 19/006* (2013.01); *H01H 37/58* (2013.01); *H02N 10/00* (2013.01)

(58) Field of Classification Search
CPC ..... F04B 43/028; F04B 45/045; F04B 43/043; F04B 19/006; F04B 43/04; H01H 37/58; H02N 10/00; F03G 7/06
(Continued)

(56) References Cited

U.S. PATENT DOCUMENTS 1,992,825 A * 2/1935 Heinly .......................... 472/111
3,319,729 A * 5/1967 Iwasaki ......................... 177/225
(Continued)

FOREIGN PATENT DOCUMENTS

| CN | 101364499 A | 2/2009 |
| JP | 05-083989 A | 11/1993 |

(Continued)

OTHER PUBLICATIONS

International Search Report of PCT/JP2011/054039, mailing date of May 17, 2011.
(Continued)

*Primary Examiner* — Peter J Bertheaud
*Assistant Examiner* — Dnyanesh Kasture
(74) *Attorney, Agent, or Firm* — Westerman, Hattori, Daniels & Adrian, LLP

(57) ABSTRACT

An actuator includes a first part having a magnetomotive element and configured to absorb heat up to at least a first temperature; a second part arranged so as to face the first part; a temperature-sensitive magnetic body provided between the first part and the second part and configured to move between a first position for contact with the first part and a second position for contact with the second part, the temperature-sensitive magnetic body having a Curie point lower than the first temperature and higher than a temperature of the second part; and a restoring part configured to restore the temperature-sensitive magnetic body from the first position to the second position.

17 Claims, 25 Drawing Sheets

(51) Int. Cl.
*H02N 10/00* (2006.01)
*F03G 7/06* (2006.01)
*F04B 19/00* (2006.01)

(58) Field of Classification Search
USPC .................. 310/306, 307, 10, 15–24, 12.01,
12.02,310/12.03, 12.24
See application file for complete search history.

(56) References Cited

U.S. PATENT DOCUMENTS

| | | | | |
|---|---|---|---|---|
| 5,397,948 | A | * | 3/1995 | Zoerner et al. ................. 310/46 |
| 5,533,234 | A | * | 7/1996 | Bizek ...................... E05F 1/123 |
| | | | | 16/277 |
| 5,542,821 | A | * | 8/1996 | Dugan ............................ 417/53 |
| 6,232,680 | B1 | * | 5/2001 | Bae et al. ........................ 310/17 |
| 2004/0052029 | A1 | * | 3/2004 | Joachim ........................ 361/143 |
| 2005/0078346 | A1 | * | 4/2005 | Turner ................. G02B 26/085 |
| | | | | 359/225.1 |
| 2007/0057752 | A1 | * | 3/2007 | Wang .............................. 335/37 |
| 2009/0188576 | A1 | * | 7/2009 | Kang et al. ................... 137/831 |
| 2009/0230335 | A1 | * | 9/2009 | Ocalan et al. .................. 251/14 |
| 2009/0315335 | A1 | * | 12/2009 | Ujihara et al. ................ 290/1 R |
| 2010/0296248 | A1 | * | 11/2010 | Campbell et al. ............ 361/699 |

FOREIGN PATENT DOCUMENTS

| | | |
|---|---|---|
| JP | 06-288355 A | 10/1994 |
| JP | 07-270692 A | 10/1995 |
| JP | 08-264090 A | 10/1996 |
| JP | 2003-109458 A | 4/2003 |
| JP | 2003-348866 A | 12/2003 |
| JP | 2005-184924 A | 7/2005 |

OTHER PUBLICATIONS

Office Action dated Feb. 27, 2015, issued in corresponding Chinese Application No. 201180067370.1, w/English translation. (23 pages).

* cited by examiner

FIG.2
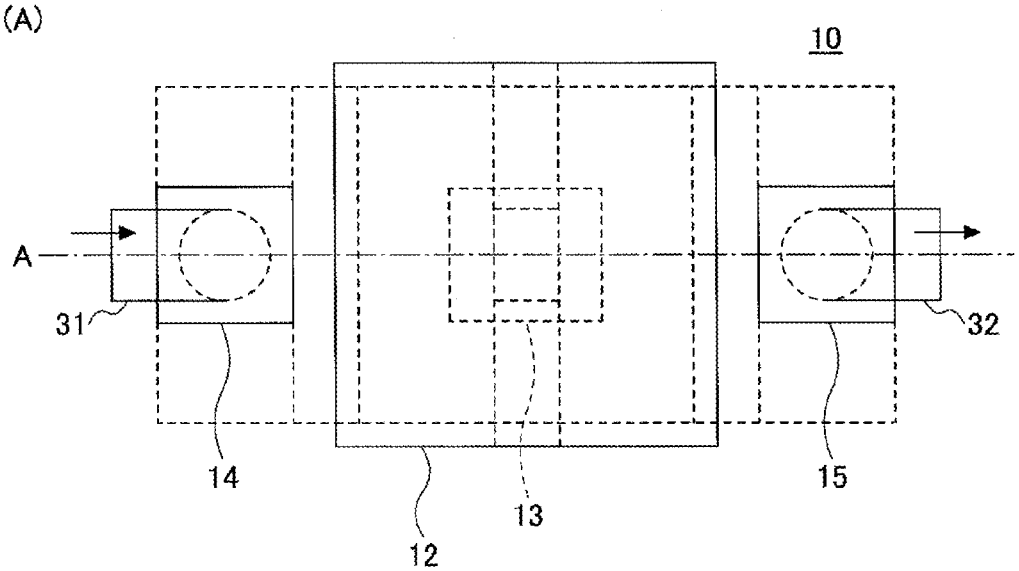
(A)
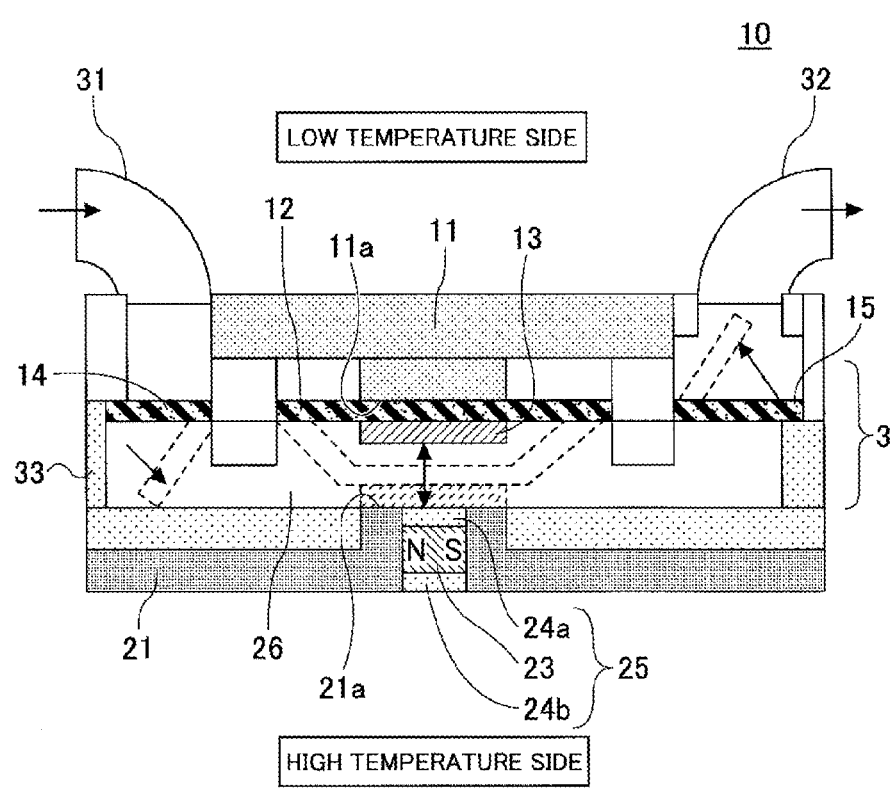
(B)

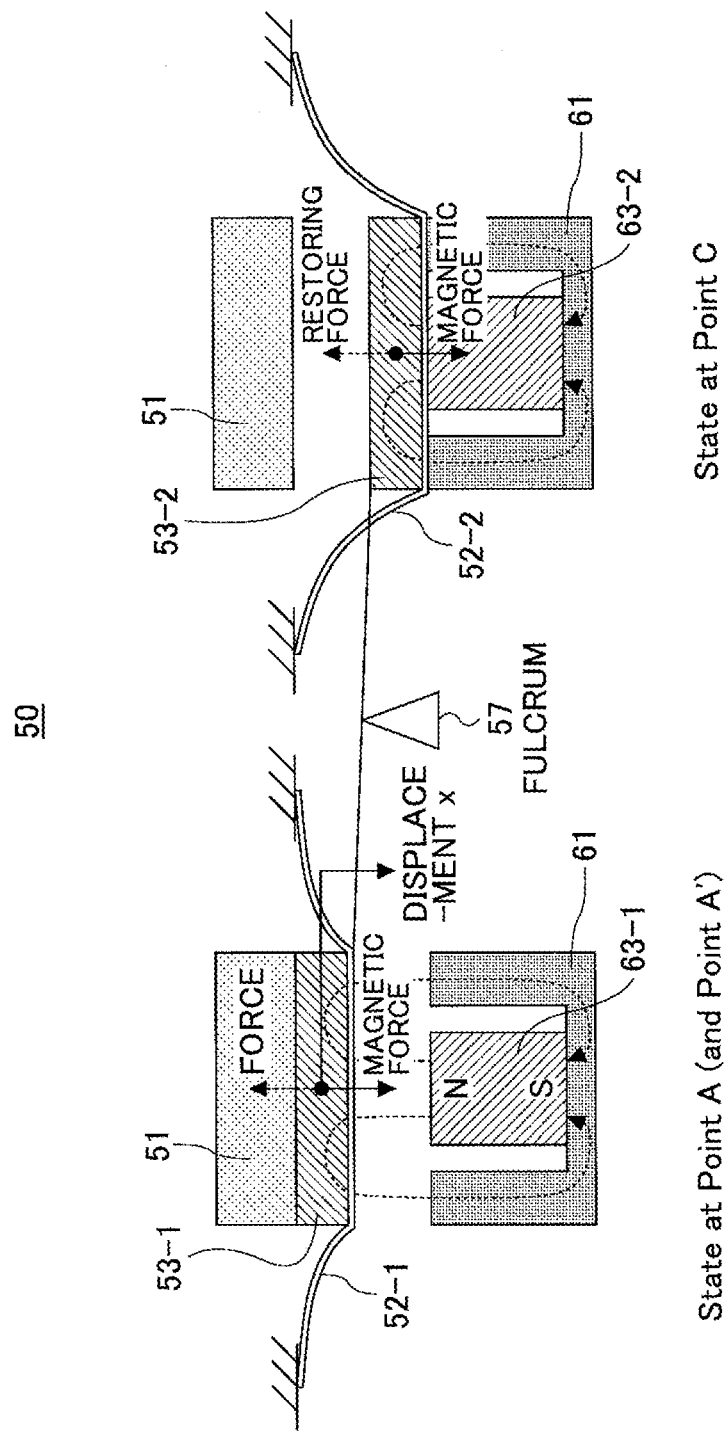

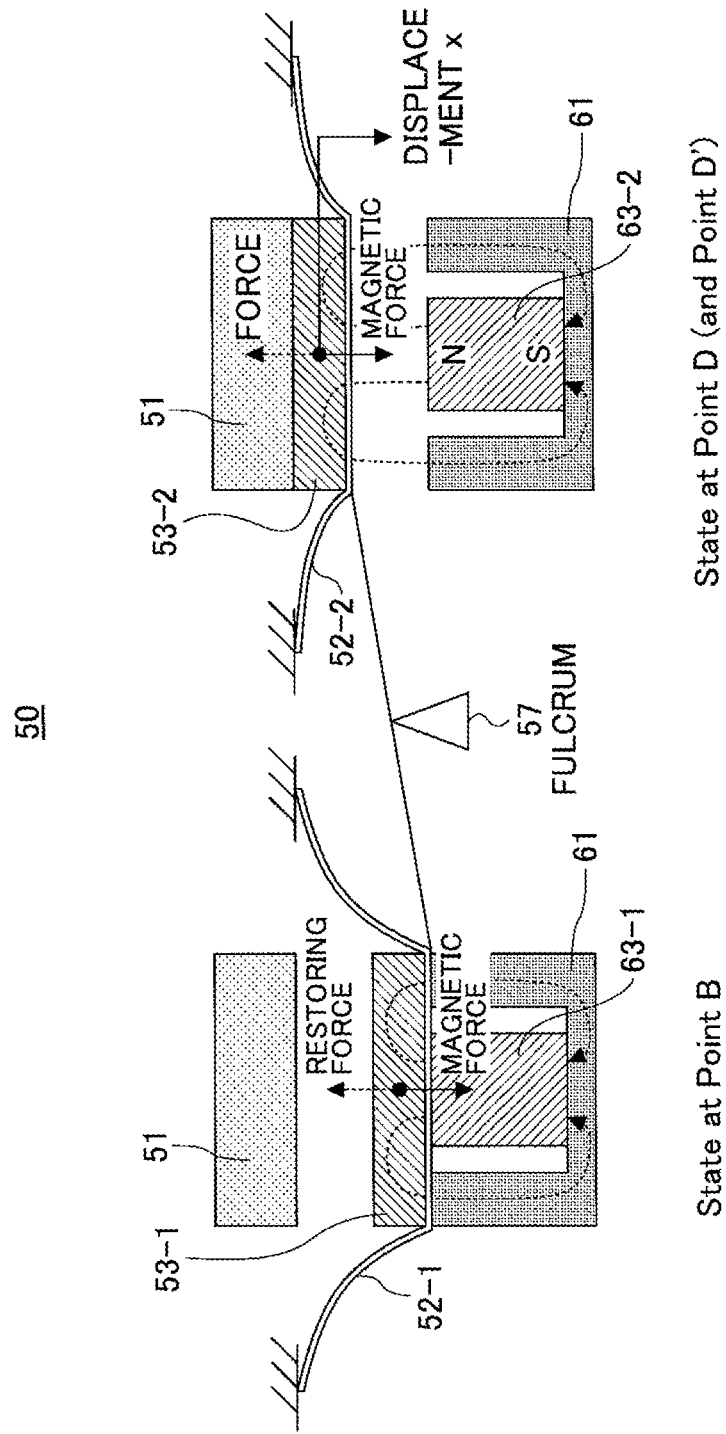

ACTUATOR, MICROPUMP, AND ELECTRONIC EQUIPMENT

CROSS REFERENCE TO RELATED APPLICATIONS

This application is a continuation application filed under 35 U.S.C. 111(a) claiming benefit of priority of PCT International Application No. PCT/JP2011/054039 filed Feb. 23, 2011 and designating the United States, which is incorporated herein by references in its entirety.

FIELD

The present disclosures relate to an actuator, a micropump using the same, and electronic equipment.

BACKGROUND

Recent progress in miniaturization and integration of LSI chips has raised an issue of increase in the amount of heat generated from LSI chips. As a countermeasure, research and development have been made on lowering power supply voltages to reduce the heat amount due to large scale integration. However, in a circuit that operates at a low voltage, the threshold voltage of transistors is set low and a leakage current is likely to increase. Reducing the heat amount by lowering power supply voltages now faces limits. Under these circumstances, there is a demand for a low-cost cooling system that can cool a LSI chip in an efficient manner, which chip is a high-density heat source equivalent to a nuclear reactor of 100 W/cm$^2$. Such a low-cost cooling system is used to cool not only signal-processing semiconductor devices such as CPUs, but also semiconductor lasers and illumination-purpose light-emitting diodes.

A water cooling system is expected as a high efficiency cooling system that is to be substituted for a conventional cooling fan. In a water cooling system, a refrigerant or a coolant flows through a sealed heat sink called a "water jacket" (or water pillow). A pump may be used to circulate the refrigerant. However, the technology has been slow to adopt a pump in a cooling system because a pump is an extra component in terms of cost and power consumption. In addition, when a water pillow is made smaller to fabricate a high-efficiency water jacket, pressure loss will increase in a water channel and the power-consumption and the mechanical workload on the pump will increase. The larger the pump size, the greater the cost is. Increase in the power consumption also increases the amount of heat dissipation.

One possible method is to use an auxiliary pump. Conventionally, piezoelectric diaphragm pumps have been suggested (see, for example, Patent Document 1 listed below). FIG. 1 illustrates a structure of a conventional micropump using a piezoelectric diaphragm. The pump has a diaphragm 1010 consisting of a piezoelectric plate facing a pressure chamber 1050. An upper electrode 1011 and a lower electrode 1013 of the piezoelectric plate (diaphragm) 1010 are connected to an upper wiring 1021 and a lower wiring 1023, respectively, to cause the diaphragm to move in the vertical direction under the application of a voltage. In this configuration, power is supplied to drive the pump to perform mechanical work. However, the voltage level for driving a piezoelectric actuator is generally high, requiring electric energy to operate the driving circuit. In addition, it is difficult for the piezoelectric actuator to increase the flow rate of the pump due to small displacement.

On the other hand, a switch using a temperature-sensitive magnetic material with a Curie point is known (see, for example, Patent Document 2 and Patent Document 3 listed below). By heating a stationary temperature-sensitive magnetic material to a temperature above the Curie point, a change is caused in the magnetic field, which phenomenon serves as a switch. However, once a temperature becomes high, the switch always remains in the ON state without performing ON/OFF switching.

PRIOR ART DOCUMENTS

Patent Document 1: Japanese Laid-open Patent Publication No. 06-288355
Patent Document 2: Japanese Laid-open Patent Publication No. 2003-109458
Patent Document 3: Japanese Laid-open Utility Model Publication No. 05-83989

SUMMARY

In view of the above-described problems, an actuator that drives an auxiliary pump autonomously using thermal energy, instead of electric energy, is provided in the present disclosure. A micropump and electronic equipment using such an actuator are also provided.

In one aspect of the present disclosure, an actuator includes a first part having a magnetomotive element and configured to absorb heat up to at least a first temperature; a second part arranged so as to face the first part; a temperature-sensitive magnetic body provided between the first part and the second part and configured to move between a first position for contact with the first part and a second position for contact with the second part, the temperature-sensitive magnetic body having a Curie point lower than the first temperature and higher than a temperature of the second part; and a restoring part configured to restore the temperature-sensitive magnetic body from the first position to the second position.

In another aspect of the present disclosure, a micropump using the above-described actuator is provided. The micropump includes the above-described actuator, a chamber forming a channel between the first part and the second part of the actuator; and a diaphragm coupled to the temperature-sensitive magnetic body and displaced in the chamber; wherein when the temperature-sensitive magnetic body moves from the second position to the first position, the diaphragm increases a pressure in the chamber, while when the temperature-sensitive magnetic body moves from the first position to the second position, the diaphragm decreases the pressure in the chamber.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 2 illustrates a structure of a micropump making use of a Curie point of a magnetic body as an example of an actuator according to Embodiment 1;

FIG. 9A is a diagram illustrating how a micropump with a temperature-sensitive magnetic body works;

FIG. 9B is a diagram illustrating how a micropump with a temperature-sensitive magnetic body works;

DESCRIPTION OF EMBODIMENTS

Figure 1:
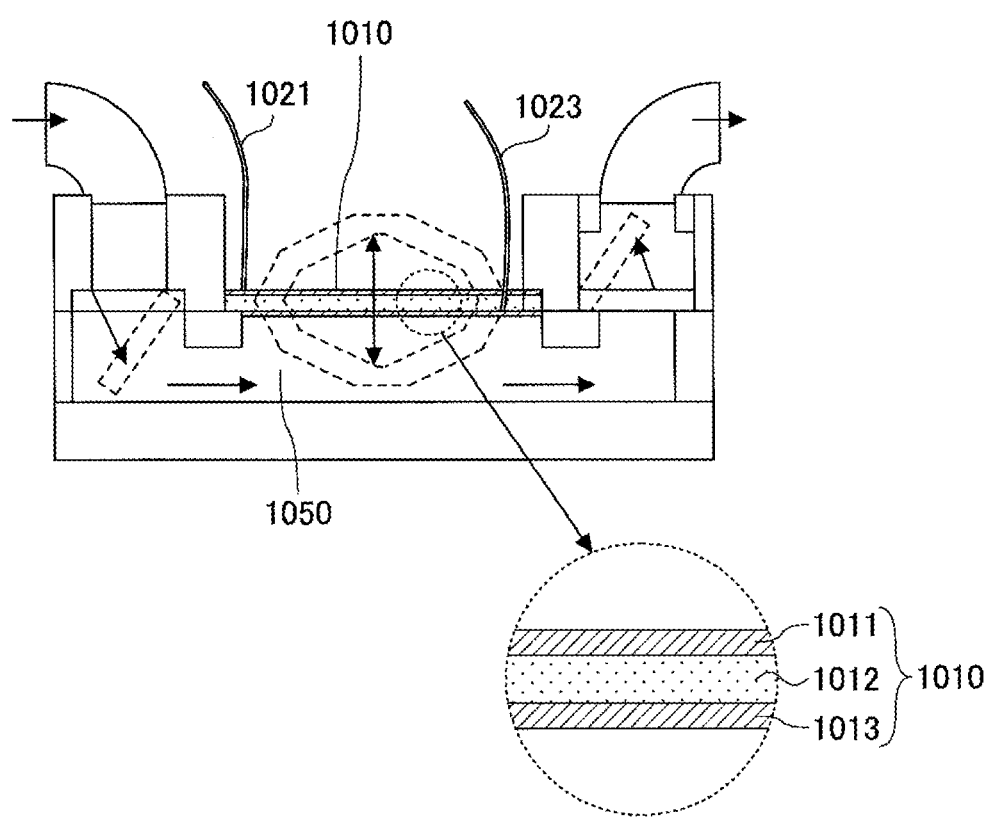
FIG. 1 illustrates a structure of a conventional micropump using a piezoelectric diaphragm.

Embodiments of the present disclosure are described with reference to the drawings. The embodiments described below illustrate structures and operations of an actuator which can operate autonomously by making use of a Curie point of a magnetic body. Explanation is made of an autonomously operating micropump and a thermal actuator or a temperature-sensitive switch, as applications of the actuator.

In the embodiments, a ferromagnetic body (for example, a stationary magnet) is arranged on a high temperature side, and a temperature-sensitive magnetic body having a Curie point lower than the temperature of the thermal environment in which the ferromagnetic body is placed is used. Based upon a change in the magnetic permeability of the temperature-sensitive magnetic body due to a temperature change, a force of attraction between the stationary magnet and the temperature-sensitive magnetic body is produced or lost. Making use of this phenomenon, the temperature-sensitive magnetic body can be used as a movable body which autonomously moves between a first position for contact with a member on the high temperature side and a second position for contact with a member on the low temperature side. The temperature-sensitive magnetic body repeats heat absorption on the high temperature side and heat dissipation on the low temperature side.

Actual structures and operations will be described below in more detail.

Embodiment 1

FIG. 2 is a schematic diagram illustrating a micropump 10 which is an application of an actuator of Embodiment 1. FIG. 2A is a top view of the micropump 10, and FIG. 2B is a cross-sectional view taken along the line A-A'.

The micropump 10 has a high-temperature-side member (a first part) 21 which is heated to a first temperature, a low-temperature-side member (a second part) 11 facing the high-temperature-side member 21, and an intermediate member 3 arranged between the high-temperature-side member 21 and the low-temperature-side member 11. The intermediate member 3 includes a temperature-sensitive magnetic body (a movable magnetic body) 13 having a Curie point lower than the first temperature and movable between the high-temperature-side member 21 and the low-temperature-side member 11. The intermediate member 3 also includes a restoring means such as an elastic diaphragm 12 to cause the movable magnetic body 13 to return to a predetermined position.

The high-temperature-side member 21 has a magnetomotive means (magnetic flux generating circuit) 25 on its first face 21 which comes into contact with the movable magnetic body 13. The magnetomotive means includes a stationary magnet 23 with a Curie point higher than the first temperature. The position at which the movable magnetic body 13 comes into contact with the first face 21a of the high-temperature-side member 21 is a first position. The low-temperature-side member 11 has a second face 11a that faces the first face 21a. The position at which the movable magnetic body 13 comes into contact with the second face 11a of the low-temperature-side 11 is a second position. A diaphragm 12 is attached to the movable magnetic body 13, and moves between the first position and the second position in a chamber 26 in accordance with the motion of the movable magnetic body 13, as indicated by the phantom line (dashed line) in the bottom part (B) of FIG. 2. The motion of the diaphragm 12 causes a pressure change in the chamber 26.

The micropump 10 also has an inlet 31 to introduce a fluid (not illustrated) into the chamber 26, an outlet 32 to drain the fluid from the chamber 26, and an inlet valve 14 and an outlet valve 15 to prevent reverse flow of the fluid. The inlet valve 14 and the outlet valve 15 each move between open positions and closed positions according to the motion of the diaphragm 12, as indicated by the arrows and the phantom lines (dashed lines).

FIG. 2 illustrates an initial state of the micropump 10, and accordingly, both the inlet valve 14 and the outlet valve 15 are closed. The movable magnetic body 13 is at the second position being in contact with the low-temperature-side member 11, and there is no transformation occurring in the diaphragm 12. In this example, the initial position corresponds to the second position on the low temperature side. In practical use, the micropump 10 is arranged such that a bottom face of the high-temperature-side 21 is brought into contact with a heat source such as a LSI chip or a semiconductor package. The low-temperature-side member 11 may be arranged so as to be in contact with a heat absorbing means such as a water jacket (not illustrated). Alternatively, a micro-channel (not illustrated) may be formed inside the low-temperature-side member 11.

The movable magnetic body 13 is a temperature-sensitive magnetic body having a Curie point lower than a heat transfer temperature of the heat source. The movable magnetic body 13 may be made of Cr (386 K of Curie point), MnAs (318 K) or Gd (292 K). Because the Curie point of the movable magnetic body 13 is lower than the temperature of the thermal environment, the magnetic permeability of the movable magnetic body 13 changes drastically at the Curie point, which causes the spontaneous magnetizing force to appear and disappear.

The stationary magnet 23 arranged on the high temperature side is a ferromagnetic body with a Curie point higher than the heat transfer temperature of the heat source. Accordingly, even if the high-temperature-side member 21 is heated to the first temperature by absorbing heat from the heat source, its magnetic permeability does not change, therefore not losing the ferromagnetic property. The stationary magnet 23 may be held between a pair of core members 24a and 24b to form a magnetomotive means (magnetic flux generating circuit) 25.

The Curie point changes depending on the composition of a magnetic material, and it varies widely. For example, with a single element, Iron (Fe) indicates a value around 770° C., Nickel (Ni) indicates 364° C., and Gadolinium (Ge) indicates 20° C. For oxide magnetic materials such ferrites, Curie points vary in the similar range by changing the composition of the metallic oxide. For example, a ferrite with Nickel (Ni) and Zinc (Zn) added has a Curie point around room temperature.

In the micropump of FIG. 2, the Curie point of the movable magnetic body 13 is selected in the temperature range higher than the room temperature and lower than the temperature in the thermal environment, for example, it is set to 50° C. On the other hand, the Curie point of the stationary magnet 23 is selected so as to be substantially higher than the temperature of the thermal environment, for example, it is set to 800° C.

Figure 3A:
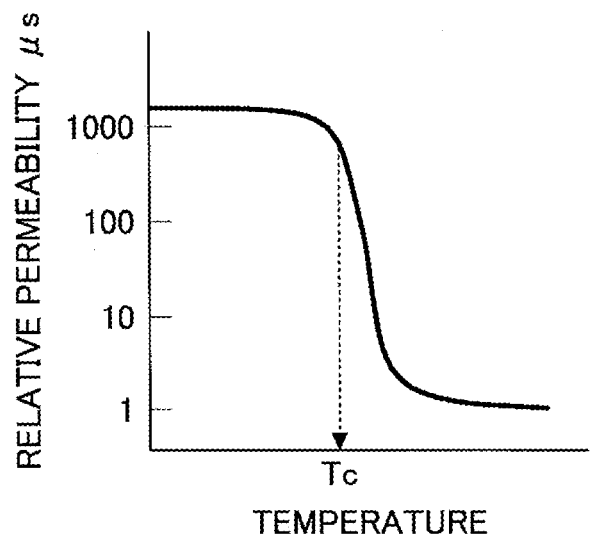
FIG. 3A is a graph illustrating a temperature characteristic of the magnetic body.
Figure 3B:
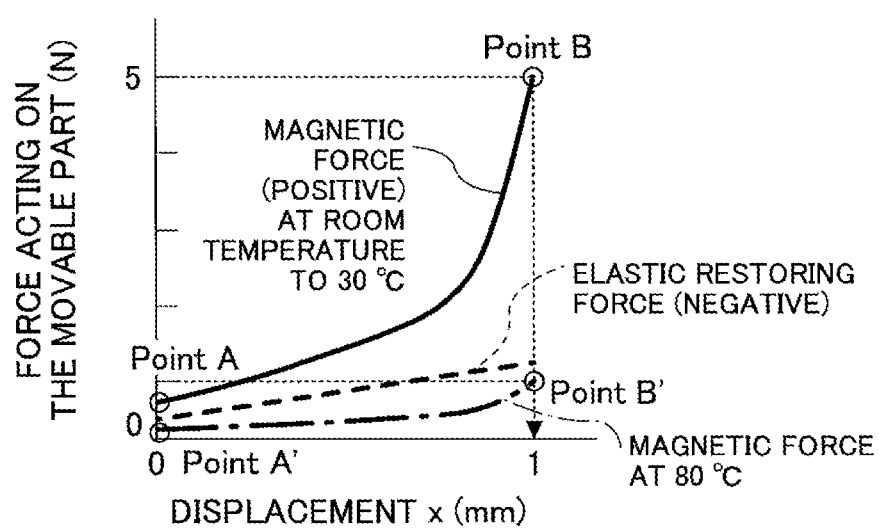
FIG. 3B is a graph for explaining the principle idea of the micropump of Embodiment 1.
Figure 3C:
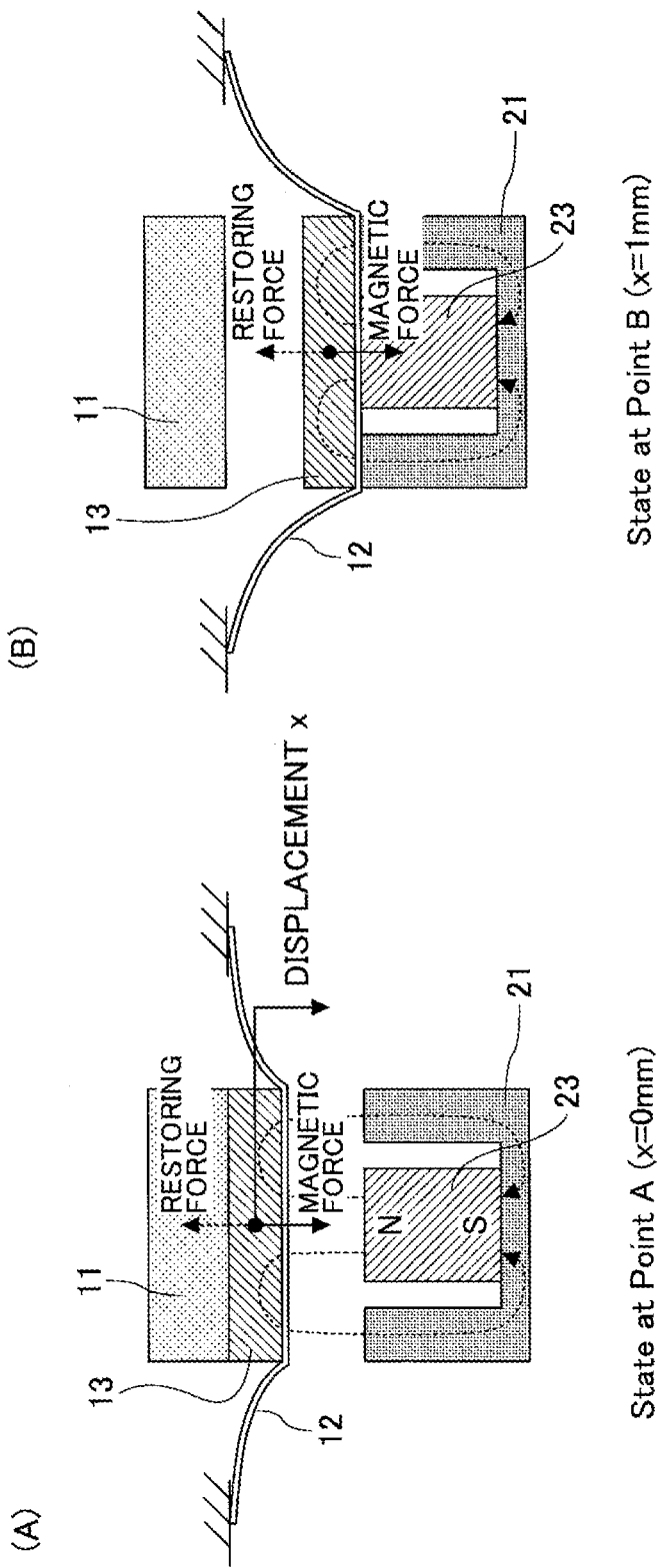
FIG. 3C is a diagram illustrating how the micropump of Embodiment 1 works.

FIG. 3A through FIG. 3C illustrate the technical concept of making use of the Curie point of a magnetic body. In FIG. 3A, the horizontal axis represents temperature, and the vertical axis represents relative magnetic permeability [μs] of a magnetic body. The magnetic body has a high permeability in the temperature range lower than the Curie point (Tc), and it exhibits ferromagnetic behavior. When the temperature rises and exceeds the Curie point (Tc), the permeability falls abruptly. Above the Curie point, almost no magnetization is presented without an externally applied magnetic field. Even if a magnetic field is applied, only a weak magnetization occurs in the direction of the magnetic field.

Since Curie temperature varies according to the composition of a material as has been described above, a ferromagnetic material with a Curie point sufficiently higher than the temperature of the heat source (the first temperature) is selected for the stationary magnet 23 on the high temperature side in the embodiment. For the movable magnetic body 13, a ferromagnetic material with a Curie point lower than the first temperature and slightly higher than the room temperature is selected.

FIG. 3B is a graph for illustrating a relationship between amount of displacement x [mm] of the movable magnetic body 13 and magnetic force [N] acting on the movable magnetic body 13 at respective temperatures. Point A in the graph indicates the initial position of the movable magnetic body 13 with displacement x of 0 mm, at which the movable magnetic body 13 is at the second position being in contact with the lower-temperature-side member 11 as illustrated in the left part (A) of FIG. 3C. Point B indicates the state in which the movable magnetic body 13 has moved to the first position being in contact with the stationary magnet 23 on the high temperature side, as illustrated in the right part (B) of FIG. 3C, with displacement x of 1 mm in this example. A direction in which the movable magnetic body 13 is attracted to the stationary magnet 23 is a positive direction, and a direction in which the restoring force of the diaphragm 12 acts is a negative direction.

In the graph, the solid line indicates a magnetic force acting on the movable magnetic body 13 in the temperature range from room temperature to 30° C. The chain line indicates a magnetic force acting on the movable magnetic body 13 at 80° C. The restoring force of the diaphragm 12 is indicated by the dashed line, which is located between the magnetic force acting at the room temperature (the solid line) and the magnetic force acting at the temperature of the heat source (the chain line). At a temperature lower than the Curie point, the movable magnetic body 13 exhibits a ferromagnetic property and it is attracted to the stationary magnet 23 due to the influence of the magnetic field generated from the stationary magnet 23 depicted in FIG. 3C. Along with the increase in displacement x, namely, along with the motion of the movable magnetic body 13 toward the stationary magnet 23 (point B), the magnetic force acting on the movable magnetic body 13 increase greatly (as indicated by the solid line). This attractive force is greater than the restoring force of the diaphragm 12, and consequently, the movable magnetic body 13 is displaced to the position (point B) for contact with the stationary magnet 23 against the restoring force.

When the movable magnetic body 13 has come into contact with the stationary magnet 23 on the high temperature side, the magnetic permeability decreases due to heat absorption and the ferromagnetic property disappears. In this state, the magnetic force acting on the movable magnetic body 13 at the first position (Point B) becomes smaller than the restoring force of the diaphragm 12, as indicated by the chain line in the graph. Accordingly, the movable magnetic body 13 returns to the initial position, namely, the second position (Point A) being in contact with the low-temperature-side member 11, under the restoring force of the diaphragm 12.

Figure 4A:
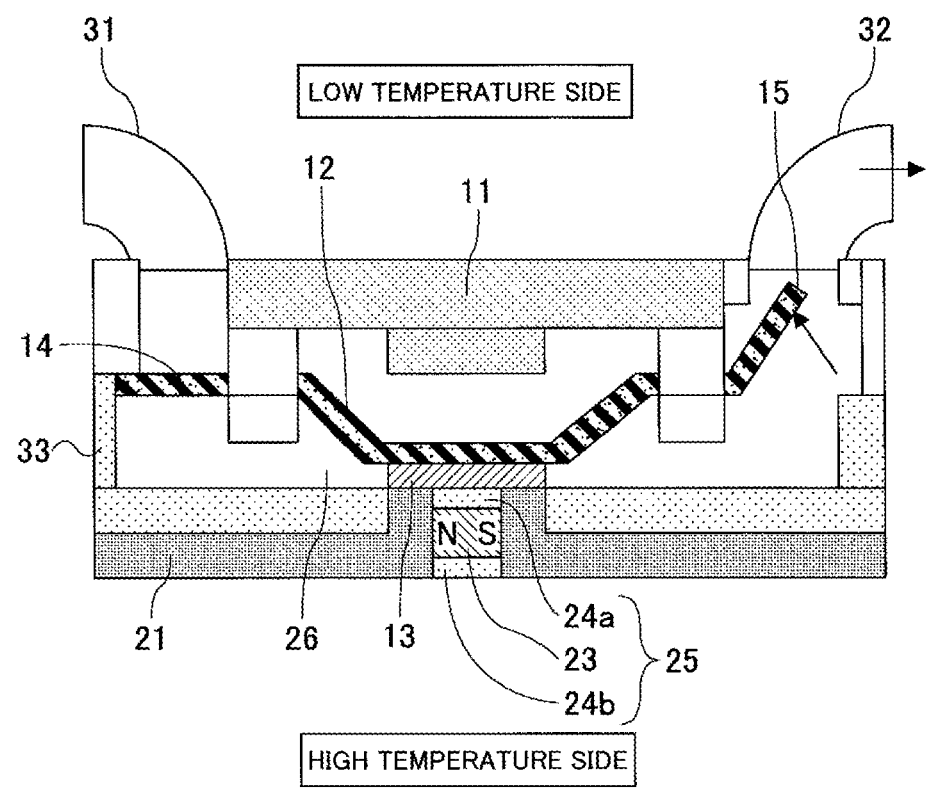
FIG. 4A illustrates an outflow cycle of the micropump of FIG. 2.
Figure 4B:
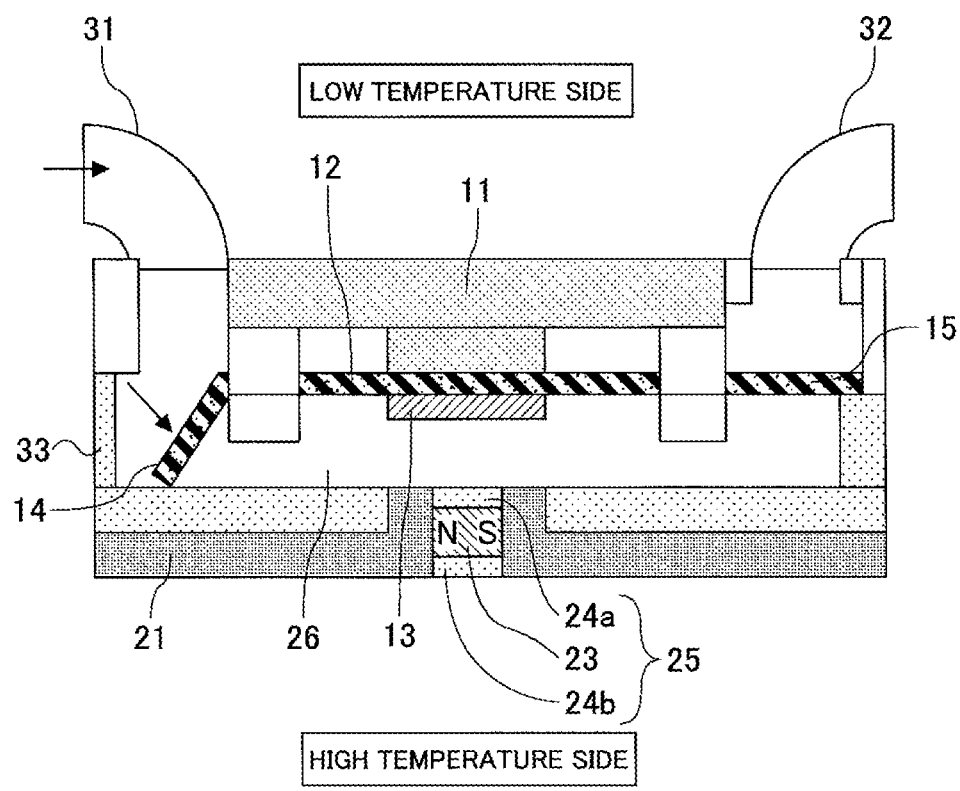
FIG. 4B illustrates an inflow cycle of the micropump of FIG. 2.

FIG. 4A and FIG. 4B are diagrams to explain the operating sequence of the micropump 10 based upon the technical concept of FIG. 3A through FIG. 3C. First, in FIG. 4A, a refrigerant (not illustrated) is introduced in the chamber 26, and the micropump 10 is placed on a heat source (not illustrated) such as a CPU so as to bring the high-temperature-side member 21 into contact with the heat source. Immediately after start of the operation of the heat source, the environmental temperature of the micropump 10 is close to the room temperature. Accordingly, the movable magnetic body 13 is influenced by the magnetic force of the stationary magnet 23 provided on the high temperature side, and moves to the first position for contact with the stationary magnet 23, overcoming the restoring force of the diaphragm 12. The diaphragm 12 adhered to the movable magnetic body 13 moves down in the chamber 26, and the internal pressure of the chamber 26 increases. As a result, the outlet valve 15 is opened upward to discharge the refrigerant. After the discharge, the internal pressure of the chamber 26 returns and the outlet valve 15 is closed. At this time, the inlet valve 14 is closed.

When the high-temperature-side member 21 is heated by heat transfer from the heat source, the movable magnetic body 13 attracted to the stationary magnet 23 is also heated through the high-temperature-side member 21. When the temperature of the movable magnetic body 13 exceeds the Curie point, the movable magnetic body 13 becomes paramagnetic and the attractive force between the stationary magnet 23 and the movable magnetic body 13 is lost. In this instance, the restoring force due to elastic deformation of the diaphragm 12 becomes greater than the attractive force. As a result, the movable magnetic body 13 returns to the second position for contact with the low-temperature-side member 11, as illustrated in FIG. 4B. Upon the restoration of the diaphragm 12, the internal pressure of the chamber 26 decreases. As a result, the inlet valve 14 opens toward the chamber 26 and the refrigerant flows in.

The movable magnetic body 13 dissipates heat by contacting with the refrigerant on the low temperature side and its temperature becomes lower than the Curie point. Then, the spontaneous magnetizing force which has been lost recovers, and the magnetic force acting from the stationary magnet 23 on the movable magnetic body 13 becomes greater than the restoring force of the diaphragm 12. Consequently, the movable magnetic body 13 is again attracted to the high temperature side, and the state transitions to one illustrated in FIG. 4A. Simultaneously, the diaphragm 12 moves down into the chamber 26, and the refrigerant in the chamber 26 is discharged from the outlet valve 15. By repeating the sequence of operations, the heat is transferred from the high temperature side to the low temperature side, which is nothing other than cooling the high temperature side.

In a preferred embodiment, an alnico magnet (Alcomax) is used as the stationary magnet 23, and an Ni—Zn ferrite with a Curie point of 50° C. is used as the movable magnetic body 13. The temperature characteristic of this ferrite is the same as that illustrated in FIG. 3A. The relative magnetic permeability around room temperature is approximately 2000. As the temperature rises, the relative magnetic permeability decreases greatly around 50° C., and it reaches 1 at approximately 80° C.

In this system, the maximum force of attraction of the stationary magnet 23 toward the movable magnetic body 13 is 5 N at room temperature, and 0.5 N attraction acts on the movable magnetic body 13 in the initial position at a separation of 1 mm from the stationary magnet 23. At 80° C., the maximum force of attraction becomes less than 1 N, and 0.1 N attraction acts on the movable magnetic body 13 in the initial position at a separation of 1 mm from the stationary magnet 23 (see FIG. 3B).

The diaphragm 12 is designed such that a restoring force of 0.4 N acts on the movable magnetic body 13 on the low temperature side (state at Point A illustrated in the left part (A) of FIG. 3C), and that a restoring force of 1.1 N acts on the movable magnetic body 13 on the high temperature side (state at Point B illustrated in the right part (B) of FIG. 3C). This arrangement is easily realized by making use of the initial deformation and the restoring force of the diaphragm 12.

With this design, the force of attraction (0.5 N) produced by the stationary magnet 23 at room temperature 20° C. at Point A on the low temperature side becomes greater than the restoring force (0.4 N) of the diaphragm 12 (0.5 N>0.4 N). As a result, the movable magnetic body 13 is attracted from the low temperature side to the high temperature side (as indicated by the solid line in FIG. 3B). At Point B on the high temperature side, the relationship between the attraction and the restoring force becomes 5 N>1.1 N, and the movable magnetic body 13 is attracted to Point B on the high temperature side (as indicated by the dashed line in FIG. 3B).

If the low temperature side is cooled at room temperature or by a refrigerant, the movable magnetic body 13 and the diaphragm 12 dissipate heat and the temperature falls. When the temperature drops to 30° C., the state again transitions to Point A. The relationship between the attraction and the restoring force becomes 0.5 N>0.4 N. As a result, the movable magnetic body 13 moves from the low temperature side toward Point B of the high temperature side.

In performing the cycle illustrated in FIG. 4A and FIG. 4B to cool a semiconductor device such as a CPU, a chamber 26 may be designed to have an effective area size of 400 mm$^2$ and a depth of 1 mm. In this case, about 0.4 ml volume of fluid can be discharged by one stroke (outflow of FIG. 4A and inflow of FIG. 4B).

Assuming that the movable magnetic body 13 is formed of a ferrite with an area size of 100 mm$^2$ and a thickness of 0.2 mm, then the heat capacity is about 0.08 J/° C. If the total thermal resistance including thermal contact resistance is 0.5 K/W, a time constant of temperature change is 40 ms by its product, and heat absorption or heat dissipation can be completed instantaneously. The actual operation is subjected to restriction of viscous resistance of the fluid. However, if the pumping is performed at 25 Hz, 10 ml/s flow is achieved, and 100 W order of heat transfer can be expected.

Embodiment 2

Figure 5A:
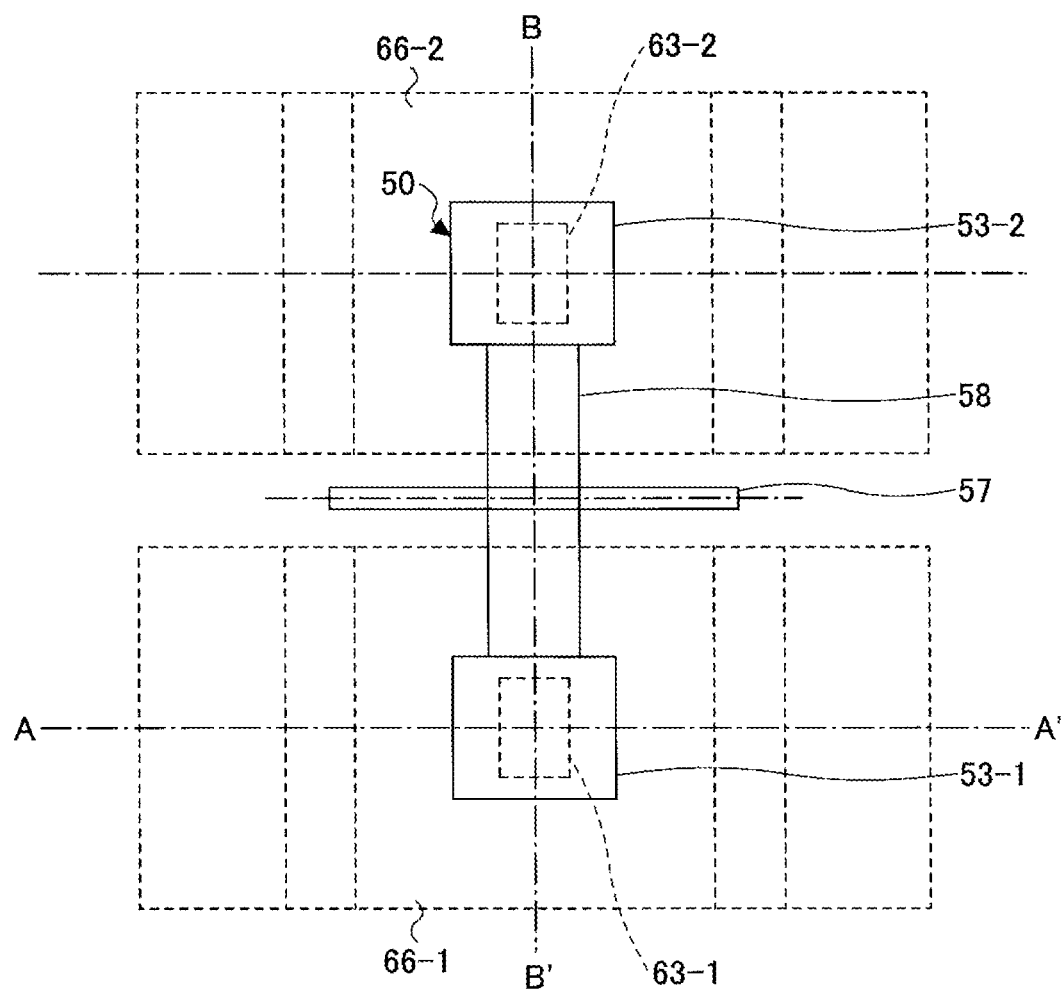
FIG. 5A is a top view of a seesaw mechanism of an actuator making use of the Curie point of the magnetic body as an example of an actuator according to Embodiment 2.
Figure 5B:
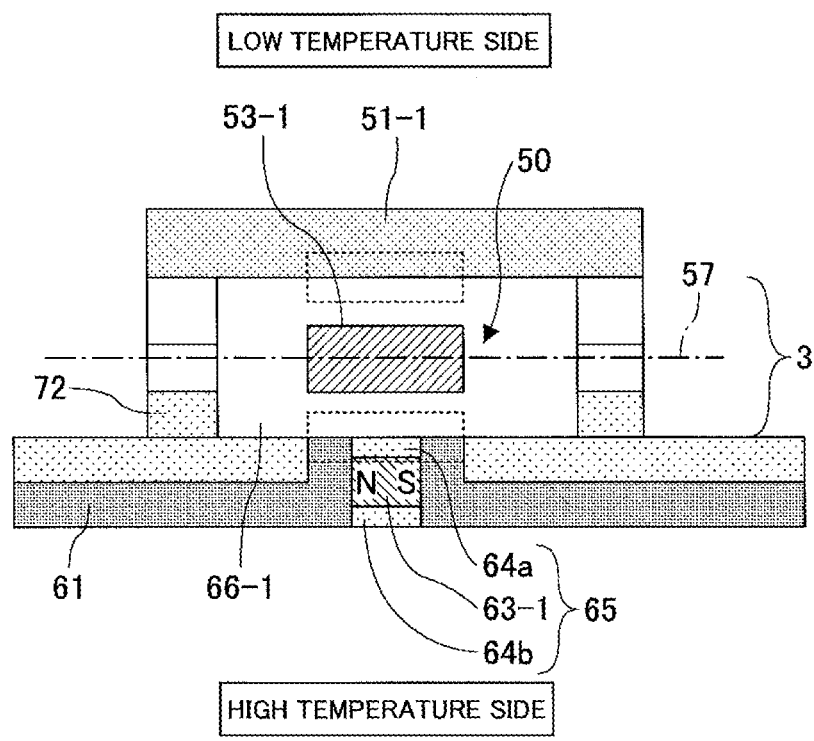
FIG. 5B is a cross-sectional view taken along the line A-A' in FIG. 5A.
Figure 5C:
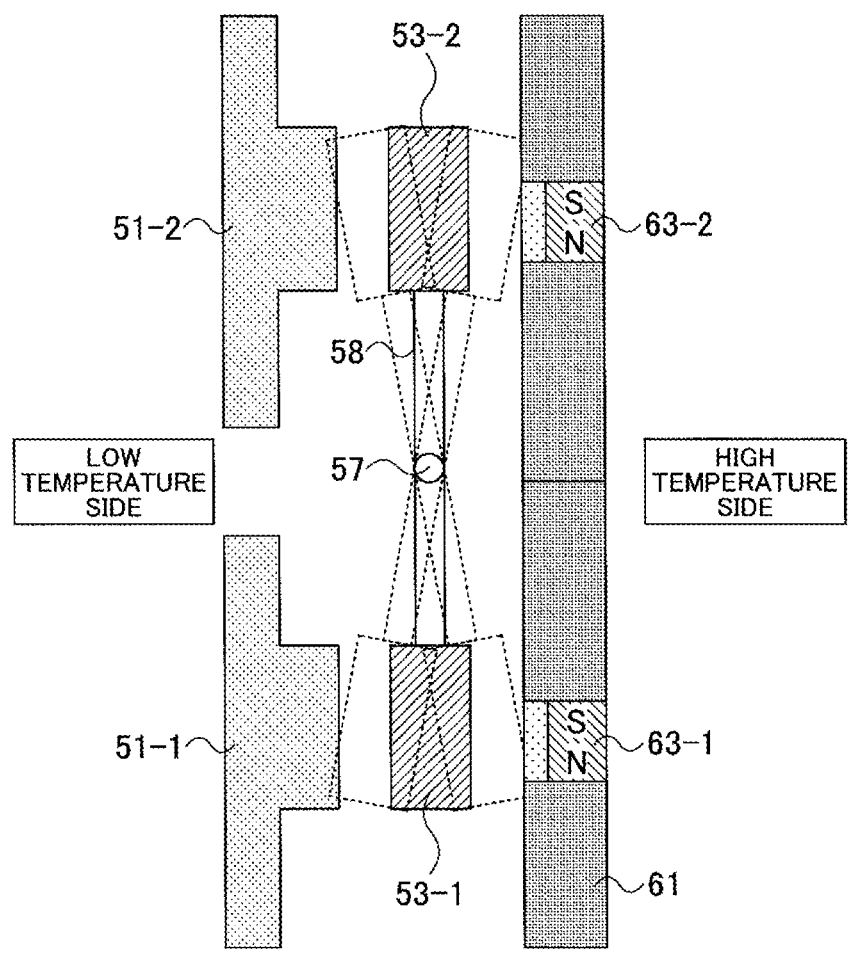
FIG. 5C is a cross-sectional view taken along the line B-B' in FIG. 5A.

FIG. 5A, FIG. 5B, and FIG. 5C illustrate a structure of an actuator which makes use of Curie point of a magnetic material according to Embodiment 2. In Embodiment 1, an elastic diaphragm 12 is used to restore the movable magnetic body 13 to the original position. In Embodiment 2, a seesaw mechanism 50 is adopted as a position recovery means to switch over the positions of a movable magnetic body. This type of actuator can be used as a thermal actuator or a temperature-sensitive switch.

FIG. 5A is a top view of the seesaw mechanism 50 of Embodiment 2, FIG. 5B is a cross-sectional view taken along the line A-A' of FIG. 5A, and FIG. 5C is a cross sectional view taken along the line B-B' of FIG. 5A. As illustrated in FIG. 5A through FIG. 5C, the seesaw mechanism 50 has a pair of temperature-sensitive magnetic bodies 53-1 and 53-2 with a Curie point lower than the temperature of the thermal environment. The temperature-sensitive magnetic bodies 53-1 and 53-2 are arranged at respective ends of a rigid body (support link) 58 and supported by a rotary shaft 57. The temperature-sensitive magnetic bodies 53-1 and 53-2 are used as movable magnetic bodies 53-1 and 53-2.

Stationary magnets 63-1 and 63-2 are provided to a high-temperature-side member 61 at positions corresponding to the movable magnetic bodies 53-1 and 53-2, respectively. The Curie point of the stationary magnets 63-1 and 63-2 is higher than the temperature (i.e., a first temperature) of the thermal environment in which the high-temperature-side member 61 is placed. For example, a ferromagnetic material with a composition having a Curie point of 800° C. is used as the stationary magnets 63-1 and 63-2. The stationary magnets 63-1 and 63-2 and core members 64a and 64b may be combined to form a magnetomotive means 65. On the other hand, the Curie point of the movable magnetic bodies 53-1 and 53-2 is lower than the temperature (the first temperature) of the thermal environment and higher than room temperature. The movable magnetic bodies 53-1 and 53-2 are formed of, for example, Ni—Zn ferrite with a Curie point of 50° C.

The seesaw mechanism 50 is provided as an intermediate layer 3 between the high-temperature-side member 61, which is heated to the first temperature, and the low-temperature-side member 51, which dissipates heat. The seesaw mechanism 50 is thermally isolated from the high temperature side and the low temperature side. The movable magnetic bodies 53-1 and 53-2 in the seesaw mechanism 50 are also thermally isolated from each other. The combination of the movable magnetic body 53-1 and the stationary magnet 63-1 and the combination of the movable magnetic body 53-2 and the stationary magnet 63-2 are placed in separate chambers 66-1 and 66-2, respectively. The chambers 66-1 and 66-2 may be formed by a heat insulating housing 72.

Figure 6:
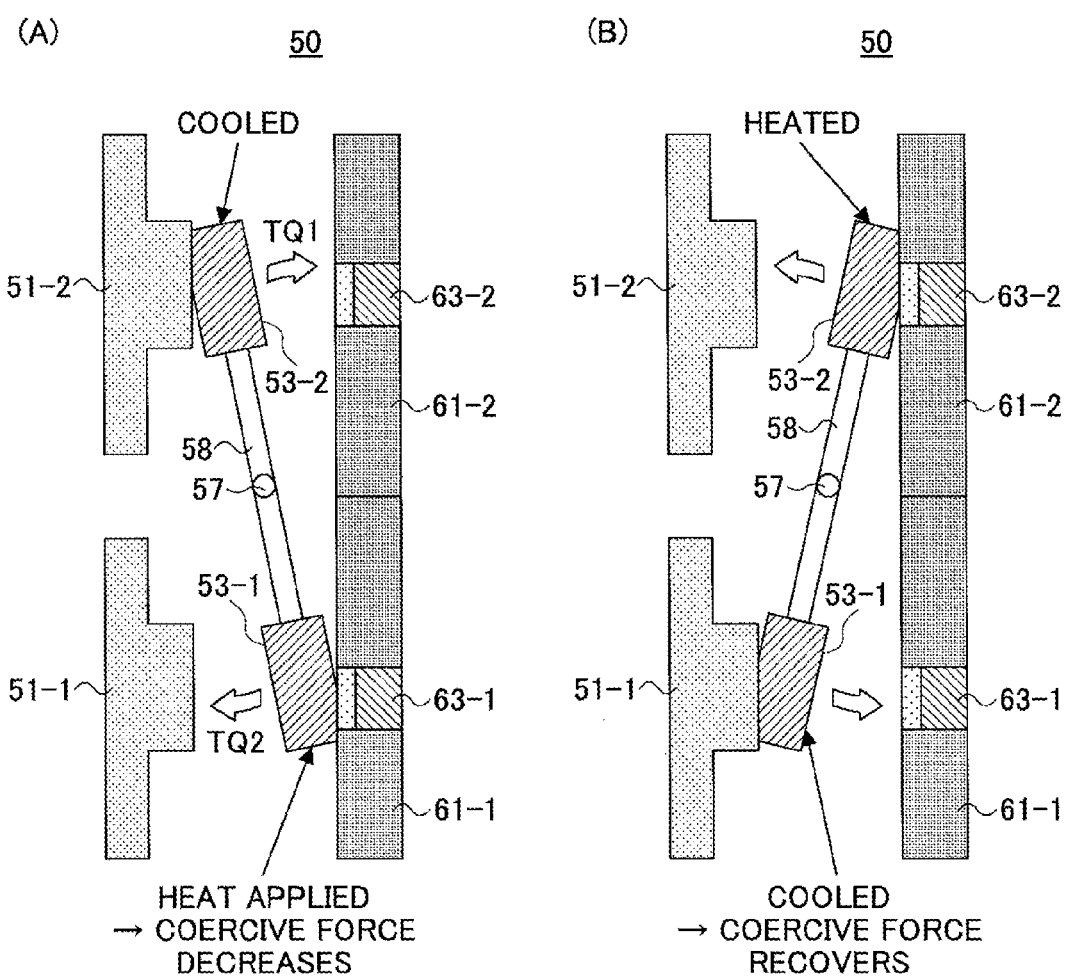
FIG. 6 illustrates switching operations of the seesaw mechanism of FIG. 5C.

FIG. 6 is a diagram for explaining switching operations of the seesaw mechanism 50. For the convenience of illustration, chamber walls for thermally insulating the combination of the movable magnetic body 53-1 and the stationary magnet 63-1 from the combination of the movable magnetic body 53-2 and the stationary magnet 63-2 are omitted.

It is assumed that the high temperature side and the low temperature side are in the same state at room temperature in the initial state. One of the movable magnet bodies (for example, the movable magnetic body 53-1) is attracted to the corresponding stationary magnet (i.e., the stationary magnet 63-1 in this example), and the other one is contacting the low temperature side. In this state, the force of attraction acting on the movable magnetic body 53-1 which is in contact with the high temperature side is sufficiently greater than the force of attraction acting on the movable magnetic body 53-2 which is in contact with the low temperature side. Accordingly, a torque around the rotary shaft 57 acts in a direction to maintain the initial state.

In operations, the high-temperature-side-member 61 is placed on an arbitrary heat source and heated to the first temperature. If the state illustrated in FIG. 6A is the initial state, the temperature of the movable magnetic body 53-1 attracted to the stationary magnet 63-1 rises along with the heat absorption of the high-temperature-side member 61. When the movable magnetic body 53-1 is heated above its Curie point, the spontaneous magnetizing force diminishes greatly. On the other hand, the other movable magnetic body 53-2 located on the low temperature side in the initial state has a spontaneous magnetizing force at room temperature that is lower than the Curie point. Accordingly, the torque TQ1 toward the high temperature side becomes dominant under the influence of the magnetic force of the corresponding stationary magnet 63-2, and the movable magnetic body 53-2 is attracted to the stationary magnet 63-2 at the high temperature side. As a reflexive effect, the movable magnetic body 53-1 which now has a paramagnetic property is subjected to a torque TQ2 toward the heat rejection side, and it rotates around the rotary shaft 57 to the low temperature side. As a result, the state transitions to one illustrated in FIG. 6B. In the state of FIG. 6B, the force acting from the high temperature side on the movable magnetic body 53-1 that has moved to the low temperature side becomes the minimum. Conversely, the force acting from the high temperature side on the movable magnetic body 53-2 that has moved to the high temperature side becomes the maximum, and the contact condition becomes stable.

The temperature of the movable magnetic body 53-1 that has moved to the low temperature side falls by heat dissipation. When the temperature becomes lower than the Curie point, the spontaneous magnetizing force is recovered. On the other hand, the temperature of the movable magnetic body 53-2 that has moved to the high temperature side rises. When the temperature becomes higher than the Curie point, the spontaneous magnetizing force diminishes. Then the magnitude relationship of the force turns back with the contact condition being turned over, and the state returns to one illustrated in the left part (A) FIG. 6.

In this manner, making use of the Curie point and employing torques produced by the seesaw mechanism 50 as the position restoration means of the movable magnetic bodies 53-1 and 53-2, the pair of the movable magnetic bodies 53-1 and 53-2 can repeat heat absorption and heat dissipation in a thermally exclusive relationship. It is desirable that the thermal contact resistances are the same on the high temperature side and the low temperature side. However, the thermal resistance the movable magnetic bodies 53-1 and 53-2 are subjected to when contacting with the low-temperature-side members 51-1 and 51-2 may be set smaller than that the movable magnetic bodies 53-1 and 53-2 are subjected to when contacting with the high-temperature-side members 61-1 and 61-2.

A sequence of actions repeating heat absorption and heat dissipation is nothing but transferring a quantity of heat from the high temperature side to the low temperature side, namely, cooling the high temperature side. Accordingly, the seesaw mechanism 50 can be applied to a cooling structure such as a micropump.

Figure 7A:
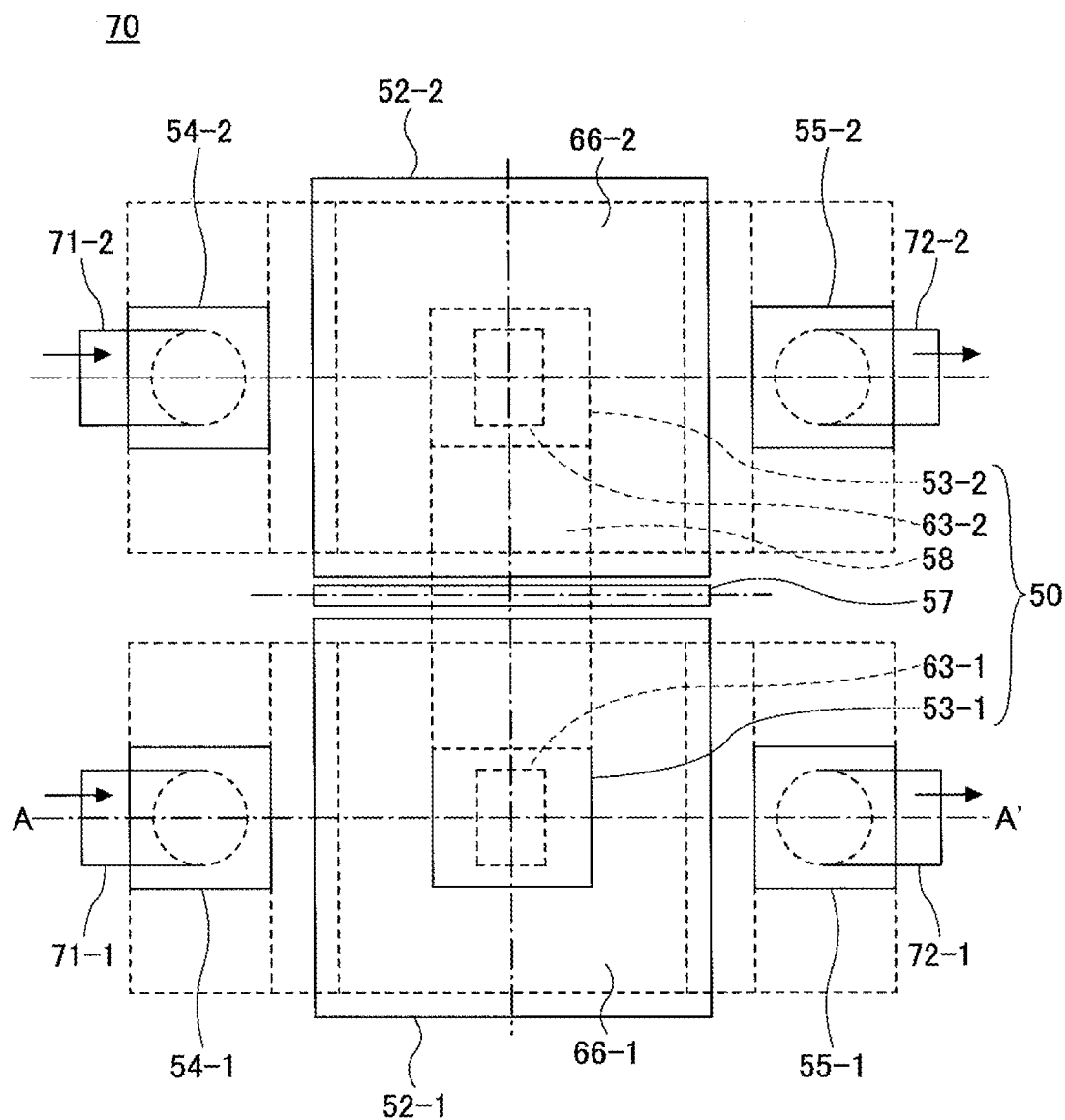
FIG. 7A is a top view of an application example of the seesaw mechanism to a micropump.
Figure 7B:
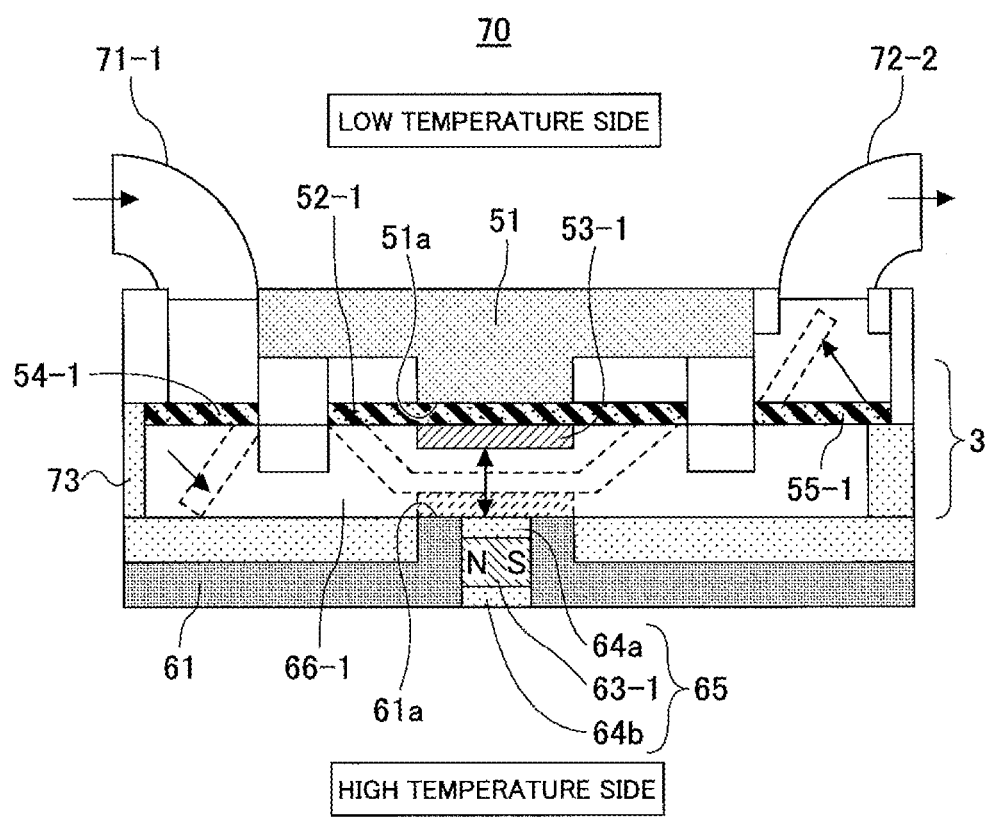
FIG. 7B is a cross-sectional view taken along the line A-A' of FIG. 7A, illustrating an application example of the seesaw mechanism to the micropump.

FIG. 7A and FIG. 7B illustrate an application of the seesaw mechanism 50 to a micropump 70. FIG. 7A is a top view, and FIG. 7B is a cross-sectional view taken along the line A-A' of FIG. 7A. The micropump 70 includes the seesaw mechanism 50 illustrated in FIG. 5A through FIG. 5C, chambers 66-1 and 66-2, and diaphragms 52-1 and 52-2 provided as pressure changing means to change the pressure inside the chambers 66-1 and 66-2 according to the motion of the seesaw mechanism 60. The chambers 66-1 and 66-2 are provided corresponding to the combination of the movable magnetic body 53-1 and the stationary magnet 63-1 and the combination of the movable magnetic body 53-2 and the stationary magnet 63-2, respectively.

Two chambers 66-1 and 66-2 are provided across the rotary shaft 57. As illustrated in FIG. 7B, each chamber has a high-temperature-side member 61 and a low-temperature-side member 51 to which a cooling unit may be provided. Between the high temperature side and the low temperature side is provided an intermediate layer 3 that is thermally insulated from both the high temperature side and the low temperature side. The diaphragm 52-1 is provided to the intermediate layer 3 so as to face the chamber 66-1.

The chamber 66-1 has an inlet 71-1 for introducing a fluid such as a coolant and an outlet 72-1 for discharging the fluid, and an inlet valve 54-1 and an outlet valve 55-1 are provided to control the inflow to and outflow from the chamber 66-1. Similarly, the chamber 66-2 has an inlet 71-2 and an outlet 72-2, and an inlet valve 54-2 and an outlet valve 55-2 are provided to control inflow to and outflow from the chamber 66-2.

In the micropump 70, as illustrated in FIG. 5A through FIG. 5C, when the movable magnetic body 53-1 is in contact with the corresponding stationary magnet 63-1 in the chamber 66-1, the diaphragm 52-1 applies compression to the inner space of the chamber 66-1 to discharge the fluid. In the other chamber 66-2, the movable magnetic body 53-2 is in contact with the low-temperature-side member 51 to maintain the diaphragm 52 at the initial position, and the fluid flows in.

As a preferred example, alnico magnets (Alcomax) are used for the stationary magnets 63-1 and 63-2 provided to the high-temperature-side member 61, and Ni—Zn ferrite with Curie point of 50° C. is used for the movable magnetic bodies 53-1 and 53-2. This ferrite exhibits a relative magnetic permeability of approximately 2000 around room temperature. When the temperature rises, the relative magnetic permeability starts decreasing significantly around 50° C., and it reaches 1 at approximately 80° C.

The movable magnetic bodies 53-1 and 53-2 are supported by a 45-mm length support link 58. A fulcrum (rotary shaft) 57 is provided in the midst of the support link 58 to allow rotation. At room temperature of 20° C., the maximum force of attraction of the stationary magnet 63 located on the high temperature side is 5 N, which force is produced when the movable magnetic body 53 is in contact with the stationary magnet 63. The force of attraction acting on the movable magnetic body 53 at a separation of 0.8 mm is 1.1 N. When the temperature rises to 80° C., the maximum force of attraction between the stationary magnet 63 and the movable magnetic body 53 is less than 1 N, and 0.1 N force of attraction is acting at a separation of 0.8 mm.

Figure 8:
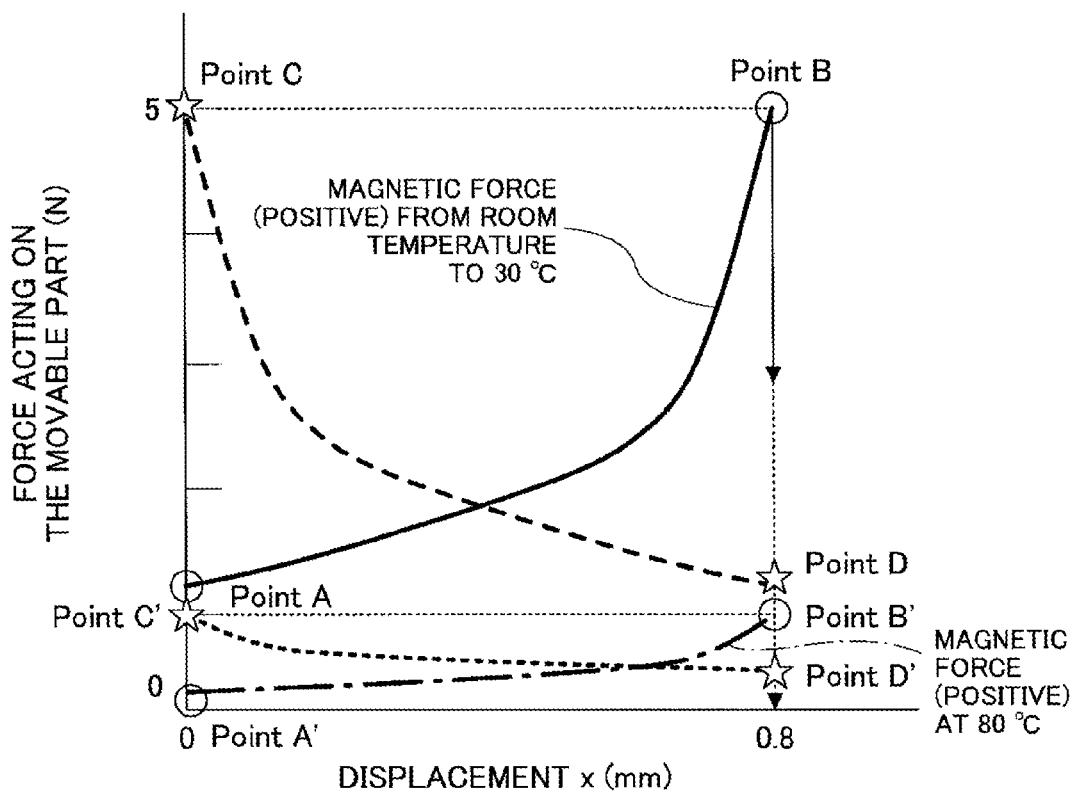
FIG. 8 is a diagram illustrating how a micropump with a temperature-sensitive magnetic body works.

FIG. 8, FIG. 9A and FIG. 9B are diagrams to explain the theory of operation of the micropump 70 illustrated in FIG. 7A and FIG. 7B. In FIG. 8, the solid line indicates a force of the magnetic field acting on one movable magnetic body 53-1 of the seesaw mechanism 50 at a temperature range from room temperature to 30° C. The dashed line indicates a force of the magnetic field acting on the other movable magnetic body 53-2 in the same temperature range. The chain line indicates a force of the magnetic field acting on one movable magnetic body 53-1 of the seesaw mechanism 50 at 80° C., and the dotted line indicates a force of the magnetic field acting on the other movable magnetic body 53-2 at 80° C.

In FIG. 8 with reference to FIG. 9A, Point A represents the state in which the movable magnetic body 53-1 is in contact with the low-temperature-side member 51 (with displacement x of 0 mm). Point C represents the state in which the other movable magnetic body 53-2 is contact with the stationary magnet 63-2 on the high temperature side. In FIG. 8 with reference to FIG. 9B, Point B represents the state in which the movable magnetic body 53-1 moves +0.8 mm toward the high temperature side and comes into contact with the stationary magnet 63-1 with the action of the seesaw. Point D represents the state in which the other movable magnetic body 53-1 moves −0.8 mm toward the low temperature side and comes into contact with the low-temperature-side member 51.

Along the solid line (at room temperature of 20° C.) in FIG. 8, the force of attraction acting on the movable magnetic body 53-1 at Point A for contact with the low temperature side is 1.1 N. The force of attraction acting on the other movable magnetic body 53-2 at Point C for contact with the high temperature side is 5 N. If the length of the support link (a rigid body) 58 is 45 mm, the magnitude relationship between the torques applied to the respective movable magnetic bodies 53-1 and 53-2 becomes $$1.1 \text{ (N)} \times 22.5 \text{ (mm)} < 5 \text{ (N)} \times 22.5 \text{ (mm)}.$$

The seesaw mechanism 50 produces a torque of right-hand turning (clockwise rotation) around the fulcrum (rotary shaft 57) of FIG. 9A, and the movable magnetic body 53-1 becomes stable in contact with the low temperature side at Point A, while the movable magnetic body 53-2 become stable in contact with the high temperature side at Point C.

When the high temperature side is at 80° C. and the temperature of movable magnetic body 53-2 rises to 80° C., the movable magnetic body 53-2 changes to paramagnetic upon exceeding the Curie point. The force of the magnetic field acting on the movable magnetic body 53-2 transmits to a Point C', and the force of attraction decreases to 1 N. Because the force of attraction acting on Point A for contact with the low temperature side is 1.1 N, the magnitude relationship of the torques becomes $$1.1 \text{ (N)} \times 22.5 \text{ (mm)} > 1 \text{ (N)} \times 22.5 \text{ (mm)},$$

where the direction of the force has reversed. The seesaw mechanism 50 produces a torque of left-hand turning (counterclockwise rotation) around the rotary shaft center, and the movable magnetic body 53-1 moves from Point A (with displacement x of 0 mm) to Point B (with displacement x of 0.8 mm). By the reflexive effect, the other movable magnetic body 53-2 start moving from Point C' to Point D'. In the meantime, the difference in force increases more and more, the states reach Point B and Point D'. At this time, the forces acting on Point B and Point D' are 5 N and 0.5 N, respectively, and the magnitude relationship between the torques becomes $$5 \text{ (N)} \times 22.5 \text{ (mm)} > 0.5 \text{ N} \times 22.5 \text{ (mm)}.$$

The seesaw mechanism 50 produces a torque of left-hand turning around the fulcrum (rotary shaft 57), the states become stable at Point B and Point D'.

When the movable magnetic body 53-2 dissipates heat on the cooling side with its temperature lowered below 30° C., the magnetic permeability is recovered and the state transmits to Point D, at which the force of attraction acting on the movable magnetic body 53-2 becomes 1.1 N. On the other hand, the temperature of the movable magnetic body 53-1 rises on the high temperature side, and the state transmits to Point B' at 80° C., at which the force of attraction becomes 1 N. The magnitude relationship between the torques becomes $$1 \text{ (N)} \times 22.5 \text{ (mm)} < 1.1 \text{ (N)} \times 22.5 \text{ (mm)},$$

where the direction of force has reversed. The seesaw mechanism 50 produces a torque of right-hand turning (clockwise rotation), and the movable magnetic body 53-1 moves from Point B' to Point A'. The other movable magnetic body 53-2 starts moving from Point D to Point C. In the meantime, the difference in force increases more and more, and the states reach Point A' and Point C. At this time, the forces acting on Point A' and Point C are 0.5 N and 5 N, respectively. The magnitude relationship between the torques becomes 0.5 (N)×22.5 (mm)<5 N×22.5 (mm).

The seesaw mechanism 50 produces a torque of right-hand turning around the rotary shaft center. The states return to those in FIG. 9A and become stable at Point A' and Point C, respectively.

The above-described cycles can be continued autonomously. In the actual operation, the chambers 66-1 and 66-2 are provided on the high temperature side as illustrated in FIG. 7A and FIG. 7B and fluid is introduced in advance. During transition from Point A to Point B, the pressure in the chamber 66-1 increases and the check valve on the outlet side opens to discharge the fluid. During transmission from Point B to Point A, the pressure in the pressure in the chamber 66-1 decreases, and the check valve on the inlet side opens to allow the fluid to flow into the chamber.

In the above-described example, the rotary shaft 57 is provided in the midst of the seesaw mechanism 50 to even the property of the magnetic attraction acting on the left-hand-side and the right-hand-side movable magnetic bodies 53-1 and 53-2. As an alternative, the principle of leverage may be applied to design such that the product of force and radius of rotation becomes substantially equal in the seesaw mechanism 50. In either case, the micropump can operate autonomously owing to thermal energy, rather than electric energy.

In Embodiment 2, temperature-dependent changes in the magnetic permeability of multiple movable magnetic bodies provided to the seesaw mechanism with a fulcrum are used. The force of attraction between the stationary magnet and one movable magnetic body and the acting force transmitted by the seesaw mechanism from another movable magnetic body are used as a power source. An interface between the low temperature side (cooling side) and the high temperature side (heat source) is provided in the pump. The movable magnetic bodies 53-1 and 53-2 are thermally insulated from the low temperature side and the high temperature side. When one of the movable magnetic bodies, for example, the movable magnetic body 53-1 comes into contact with the stationary magnet 63-1 on the high temperature side under the force of attraction, the temperature of the movable magnetic body 53-1 starts rising. Then the magnetic permeability of the movable magnetic material 53-1 decreases and the force of attraction decreases. A restoring force acts on the movable magnetic body 53-1 due to the force of attraction produced by the other movable magnetic body 53-2 in the seesaw mechanism 50. When the restoring force exceeds the decreased force of attraction, the movable magnetic body 53-1 leaves the high temperatures side and returns to the low temperature side for heat dissipation under contact with the low temperature side.

The micropump may be used as an auxiliary pump which operates automatically when intensive cooling is required, as will be described below. Such an application can reduce electric power consumption of the main pump, or downgrade the main pump, or eliminate the main pump itself, and cost can be reduced. By arranging the micropump near a water jacket which causes the greatest pressure loss in a cooling channel, the water pressure in the pipes of the channel can be reduced and a risk for a water leakage accident can be decreased.

Embodiment 3

Figure 10:
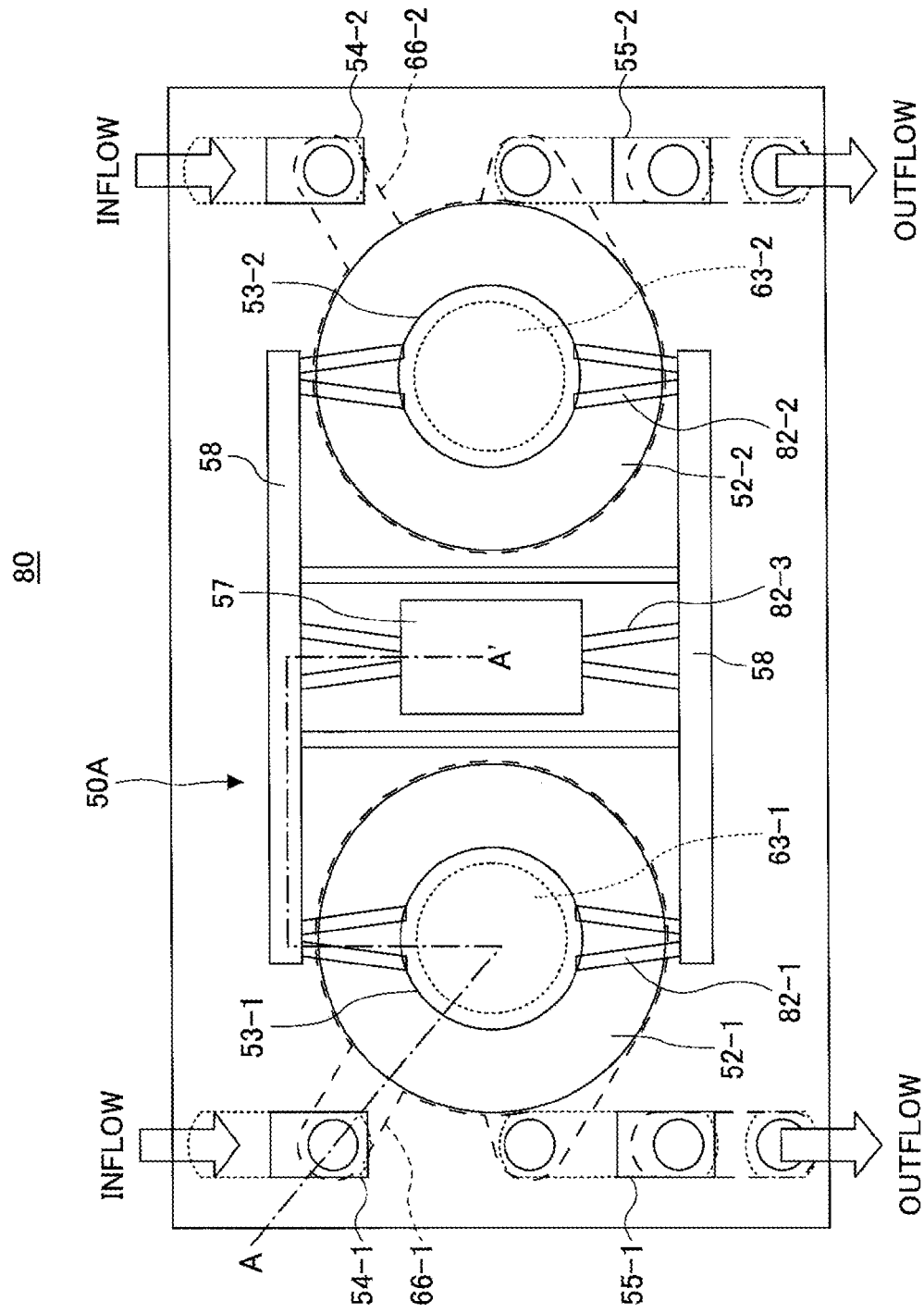
FIG. 10 illustrates a configuration example of the micropump using a seesaw mechanism with a temperature-sensitive magnetic body according to Embodiment 2.

FIG. 10 illustrates another example of micropump 80 using a seesaw mechanism. In this example of FIG. 10, a support link 58 serving as a seesaw in the seesaw mechanism 50A is formed of a pair of links 58, and the fulcrum is provided by a rotary shaft 57 which is supported by torsion springs (torsion bars) 82-3 between the two links 58. This structure reduces friction of a bearing. The restoring force by the torsion spring is set sufficiently small compared to the magnetic force acting in each state because a force to push back the seesaw mechanism 50A to the middle point is produced. Alternatively, the seesaw mechanism 50A is designed appropriately so as not to break the above-described relationships of forces.

A pair of movable magnetic bodies 53-1 and 53-2 may be suspended by torsion bars 82-1 and 82-2, respectively, across the two links 58 of the seesaw mechanism 50A so as to provide a second rotary shaft. With this arrangement, when the movable magnetic bodies 53-1 and 53-2 come into contact with the high temperature side or the low temperature side, the movable magnetic bodies 53-1 and 53-2 can deform in a self-aligning manner so as to increase the contacting area, which results in reducing the thermal contact resistance between the high temperatures part or the low temperature part. The operations of the seesaw mechanism 50A are the same as those illustrated in FIG. 9A and FIG. 9B.

The micropump 80 of FIG. 10 is furnished with stationary magnets 63-1 and 63-2 on the high temperature side so as to correspond to the pair of the movable magnetic bodies 53-1 and 53-2. Round diaphragms 52-1 and 52-2 are also used corresponding to the movable magnetic bodies 53-1 and 53-2 to control the internal pressures of the chambers 66-1 and 66-2. In the chamber 66-1, an inlet valve 54-1 and an outlet valve 55-1 are provided to introduce and discharge the fluid (refrigerant) according to the motion of the diaphragm 52-1. Similarly, in the chamber 66-2, an inlet valve 54-2 and an outlet valve 55-2 are provided to introduce and discharge the fluid according to the motion of the diaphragm 52-2.

Figure 11:
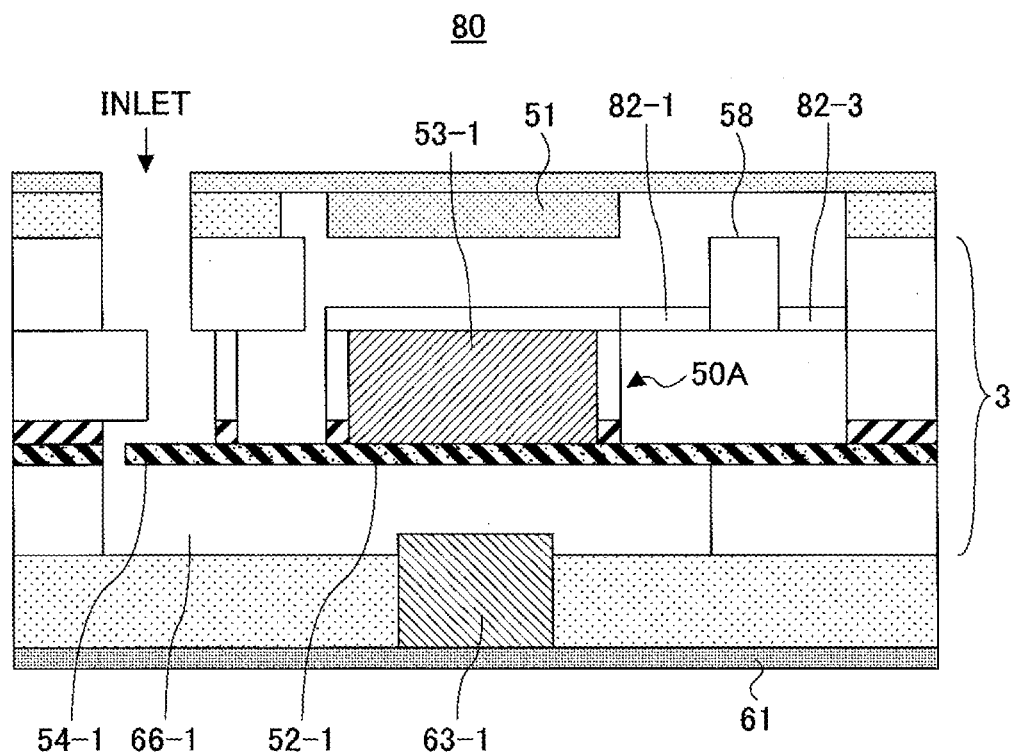
FIG. 11 is a cross-sectional view taken along the line A-A' of FIG. 10.

FIG. 11 is a cross sectional view taken along the line A-A' of the micropump 80 in FIG. 10. This cross-section illustrates the cross-sectional structure of the part from the inlet valve 54-1 of FIG. 10, through the movable magnetic body 53-1 and the torsion bar 82-1 for supporting the movable magnetic body 53-1, to the torsion bar 82-3 supporting the link 58 and the rotary shaft 57.

Referring to FIG. 10 and FIG. 11, the micropump 80 has a high-temperature-side member 61 which has a magnet 63-1 (and a magnet 63-2) as magnetomotive means, and a low-temperature-side member 51 that has a heat absorbing effect and is arranged so as to face the high-temperature-side member 61. The micropum 80 also has a temperature-sensitive magnetic body 53-1 (and a temperature-sensitive magnetic body 53-2) provided between the high-temperature-side member 61 and the low-temperature-side member 51 and configured to be movable between a first position for contact with the high-temperature-side member 61 and a second position for contact with the low-temperature-side member 51, as well as the seesaw mechanism 50A to restore the temperature-sensitive magnetic bodies 53-1 (and 53-2) to the initial position. The high-temperature-side member 61 is heated to at least the temperature of a heat source which is a target to be cooled. The temperature-sensitive magnetic body 53-1 (and 53-2) has a Curie point lower than the temperature of the thermal environment. The micropump 80 further has a chamber 66-1 (and a chamber 66-2 not illustrated) that forms a flow channel on the high temperature side, and a diaphragm 52-1 (and a diaphragm 52-2) for controlling the pressure in the chamber 66. The diaphragm 52-1 moves in the chamber 66 in accordance with the motion of the movable magnetic body 53-1.

As an unlimited example, to cool a heat source (electric component) such as a CPU, it is preferred to fabricate the chambers 66-1 and 66-2 with a diameter of 20 mm and a depth of 0.8 mm such that about 0.25 ml volume of fluid can be discharged by one action.

If the movable magnetic bodies 53-1 and 53-2 are ferrites with an area size of 100 mm$^2$ and a thickness of 0.2 mm, the heat capacity is about 0.08 J/° C. If the total thermal resistance including thermal contact resistance is 0.5 K/W, the time constant of temperature change is 40 ms by its product, and accordingly, heat absorption and heat dissipation can be completed instantaneously. The actual operation is subjected to restriction of viscous resistance of the fluid. However, if the pumping is performed at 25 Hz, 6.25 ml/s flow is achieved, and 100 W order of heat transfer can be expected.

Figure 12A:
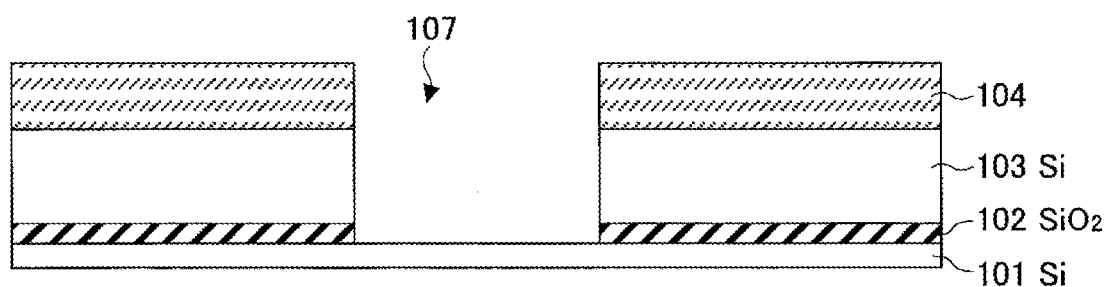
FIG. 12A illustrates a process of manufacturing a first substrate used as an intermediate member of the micropump.

FIG. 12A through FIG. 15 illustrates a process of manufacturing the micropump 80 of FIG. 11. First, as illustrated in FIG. 12A through FIG. 12C, a first substrate used as an intermediate member 3 of the micropump 80 is fabricated. In FIG. 12A, a resist 104 is applied onto a support layer (single-crystal silicon layer) 103 with a thickness of 525 μm of SOI substrate 105. The resist 104 is patterned on the silicon layer 103 by deep RIE etching. Then, a part of an intermediate oxide film 102 (SiO2 with a thickness of 1 μm) is removed by the RIE to form a hole 107. Then, the resist 104 is removed.

Figure 12B:
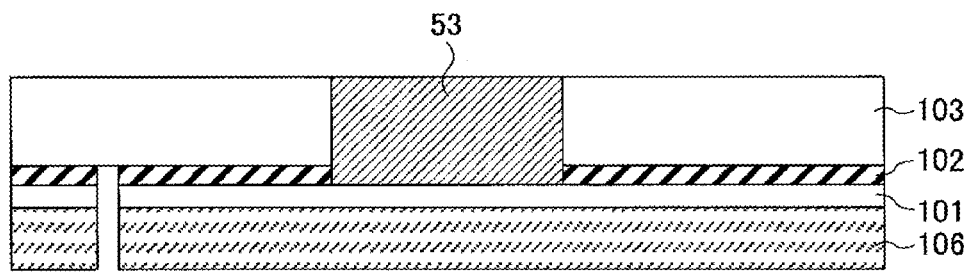
FIG. 12B illustrates a process of manufacturing the first substrate used in the intermediate member of the micropump.

In FIG. 12B, magnetic powder is put into the hole 107 which is used as a sinter mold. For example, ferrite powder with a diameter of several tens nanometer (nm), manganese oxide powder, zinc oxide powder, and copper oxide power are blended at a prescribed ratio and the blended powder is mixed with a carrier gas, which mixture is sprayed at the substrate to carry out aerosol deposition. Alternatively, the power may be bonded by a binder solution composed of water and organic components and molded by hot press molding or nanoimprinting. Then, the powder material is subjected to a heat process at a high temperature around 1000° C. to create ceramic, whereby the movable magnetic body 53 is formed. Then, a resist 106 is applied onto a device layer (single-crystal Silicon layer) 101 with a thickness of 3 μm of the SOI substrate 105, and patterned into a predetermined pattern to etch the silicon layer 101 and the silicon oxide film 102.

Figure 12C:
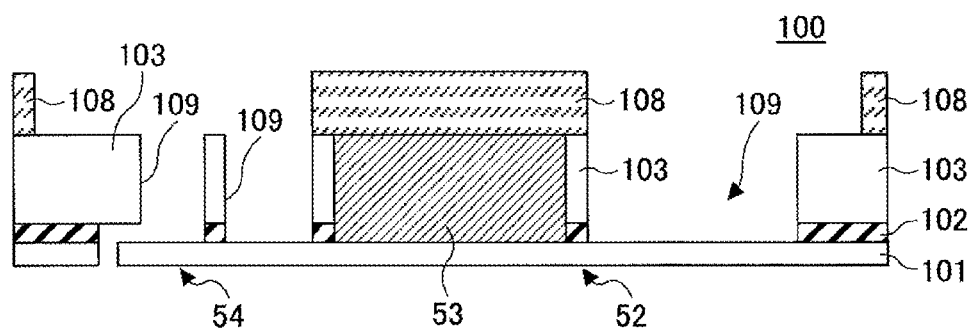
FIG. 12C illustrates a process of manufacturing the first substrate used in the intermediate member of the micropump.

In FIG. 12C, the resist 106 is removed, whereby a valve part 54 and a diaphragm part 52 are defined integrally. Although not illustrated in the figure, an outlet valve 55 is also defined integrally at the same time. A resist 108 is then applied onto the support layer 103 and patterned. A predetermined portion of the silicon 103 is etched to form an opening 109. Then, the resist 108 is removed, and the first substrate 100 is obtained.

Figure 13A:
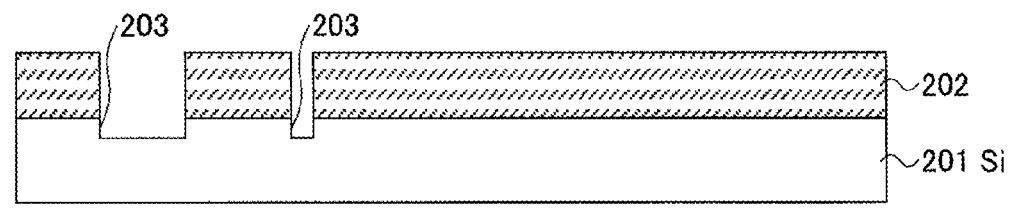
FIG. 13A illustrates a process of manufacturing a second substrate used in the intermediate member of the micropump.

Then, in FIG. 13A, a second substrate for use in the intermediate member 3 is fabricated. Another silicon wafer (a single-crystal wafer) 201 with a thickness of 525 μm is used. A resist 202 is applied onto the silicon wafer 201 and patterned into a prescribed pattern to perform half-etching of about 10 μm on the silicon substrate to form a recess 203 at a prescribed position.

Figure 13B:
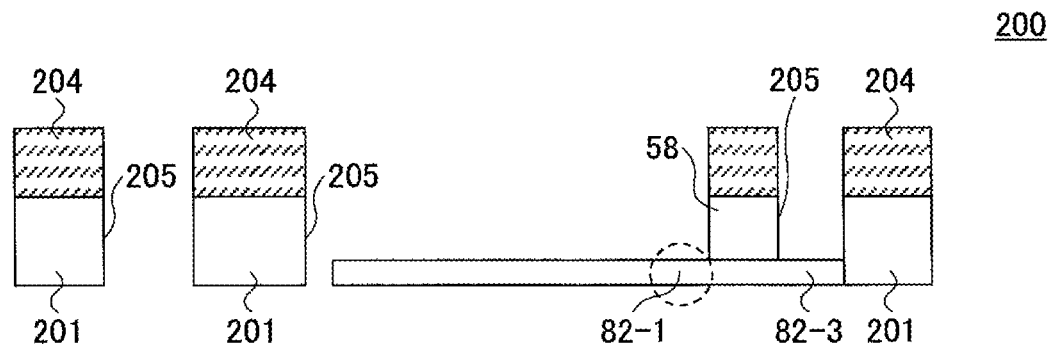
FIG. 13B illustrates a process of manufacturing the second substrate used in the intermediate member of the micropump.

Then, as illustrated in FIG. 13B, the resist 202 is removed, and a resist 204 is applied and patterned to perform deep RIE on the silicon substrate 201. By the deep RIE, prescribed portions 205 of the silicon substrate 201 are removed to process the silicon substrate 201 into a desired shape. The resist 204 is removed, and the second substrate 200 is completed. The second substrate 200 has a link 58 and torsion bars (torsion springs) 82-1, 82-2 (not illustrated), and 82-3.

Figure 14:
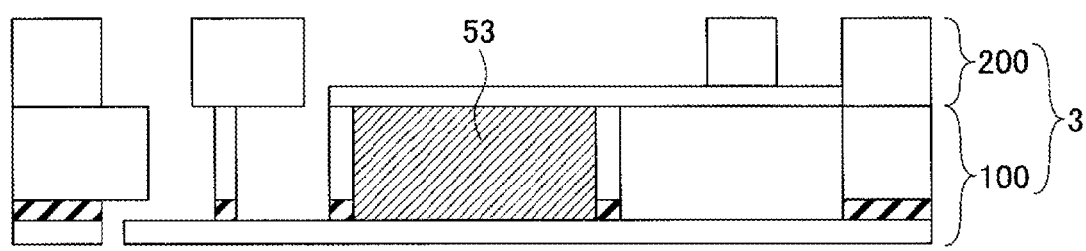
FIG. 14 illustrates a process of bonding the first substrate and the second substrate to form an intermediate member.

Then, as illustrated in FIG. 14, the second substrate 200 is bonded to the first substrate 100. To achieve secure bonding, the clean surfaces of the two substrates 100 and 200 may be bonded directly to each other and then annealing is performed at 1000° C.

Figure 15:
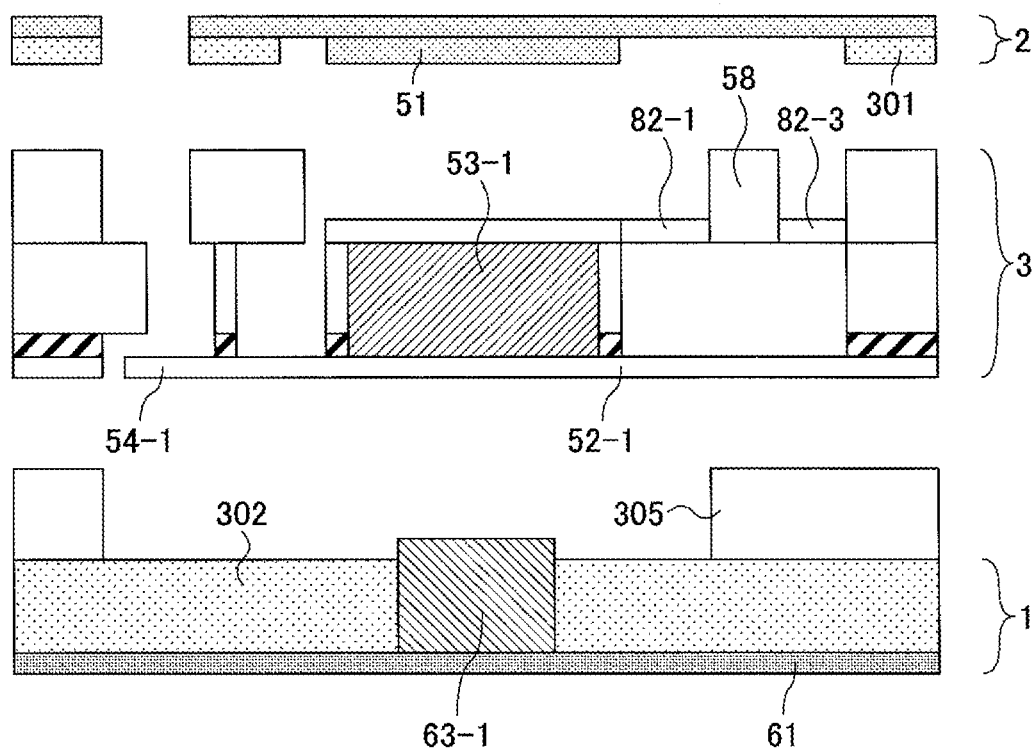
FIG. 15 illustrates a process of assembling a first part (high-temperature-side member) and a second part (low-temperature-side member) with the intermediate member.

In FIG. 15, a separately fabricated copper plate 51 is prepared. The copper plate 51 is, for example, a 1-mm thickness plate, a part of which is etched to a thickness of 0.5 mm. An epoxy adhesive 301 is dispensed on the copper plate 51 at a thickness of 100 μm and baked at 200° C. to be bonded to the copper plate 51. This part becomes a low-temperature-side member 2. Similarly, a separate copper plate 61 with a thickness of, for example, 1 mm, is prepared. Permanent magnets 63-1 and 63-2 (not illustrated) are bonded to the copper plate 61 and molded by an epoxy resin 302. This part becomes a high-temperature-side member 1. A silicone film 305 with a thickness of 0.8 mm is cut into a chamber frame and mounted on the epoxy resin 302. The high-temperature-side member 1 and the low-temperature-side member 2 are assembled with the intermediate member 3 inserted between them, and each pump chip is cut out. Then, the micropump 80 with the seesaw mechanism 50A illustrated in FIG. 11 is completed.

Figure 16:
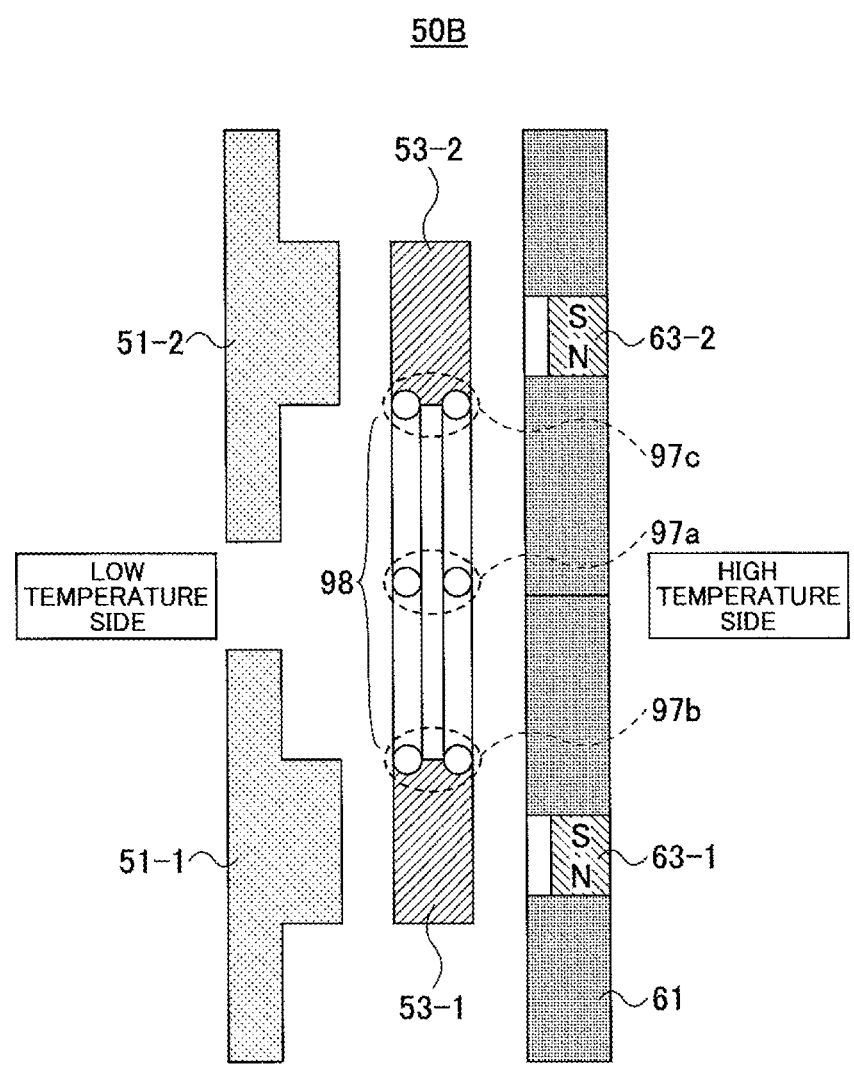
FIG. 16 illustrates a modification of the seesaw mechanism of FIG. 7.

FIG. 16 illustrates a seesaw mechanism 50B which is a modification of Embodiment 3. In this example, a support link 98 is configured to have a two-layer structure with two rotary shafts 97a at the middle point. In addition, two rotary shafts 97b are provided to the movable magnetic body 53-1, and two rotary shafts 97c are provided to the movable magnetic body 53-2. This arrangement allows translational motion of the movable magnetic bodies 53-1 and 53-2 moving up and down in parallel, and accordingly, thermal contact resistance between the movable magnetic bodies 53-1 and 53-2 and the magnetic the high temperature part or the low temperature part is reduced. This advantage will be explained in more detail.

Figure 17:
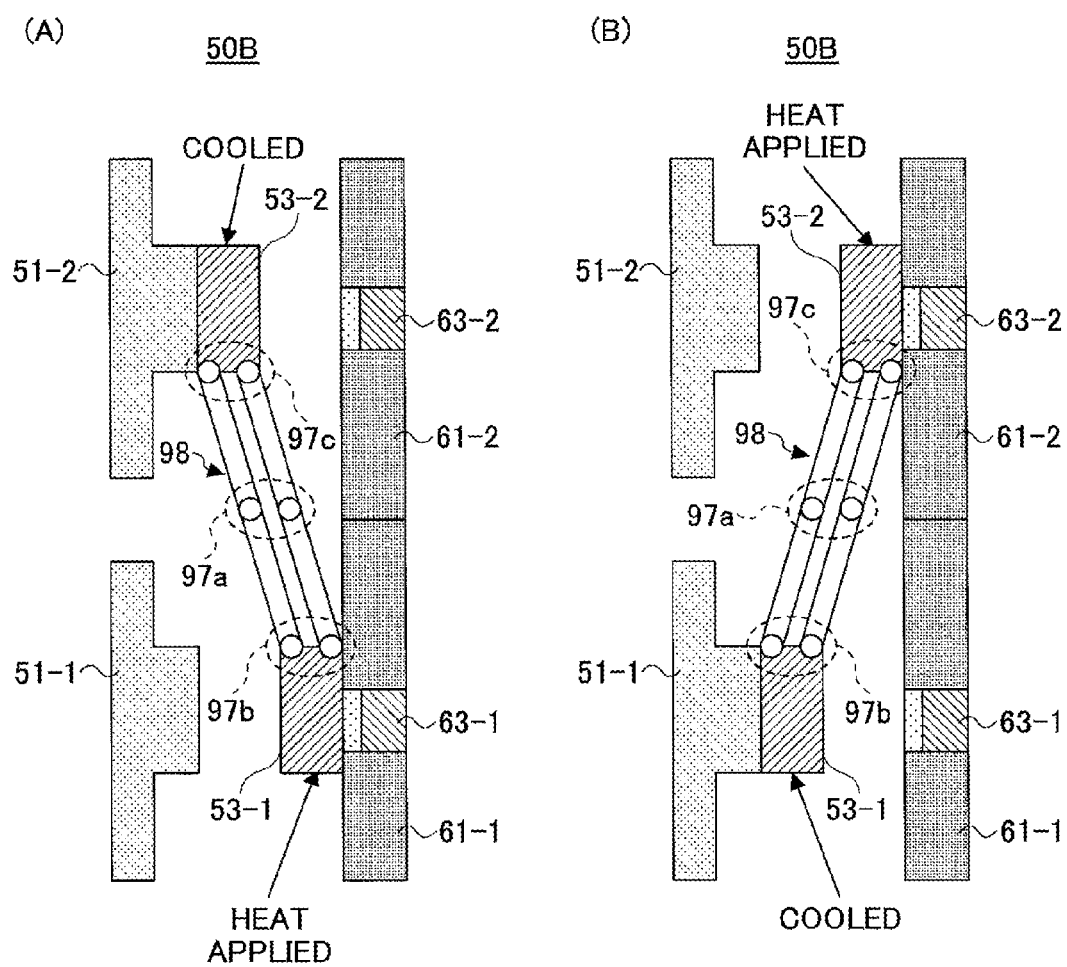
FIG. 17 illustrates a switching operation of the seesaw mechanism of FIG. 16.

FIG. 17 illustrates a switching operation of the seesaw mechanism 50B of FIG. 16. In the left part (A) of FIG. 17, in the initial state at room temperature, both the movable magnetic bodies 53-1 and 53-2 have spontaneous magnetization. The force acting from the stationary magnet 63-1 on the movable magnetic body 53-1 is greater than the force acting from the stationary magnet 63-2 on the movable magnetic body 53-2, and accordingly, the movable magnetic bodies 53-1 and 53-2 are stable in this state.

In operations, when the high-temperature-side member 61-1 is heated by receiving heat from a heat source (not illustrated), the movable magnetic body 53-1 also receives heat through the high-temperature-side member 61-1. Since the movable magnetic body 53-1 is held by the two rotary shafts 97b, the movable magnetic body 53-1 is in contact with the high-temperature-side member 61-1 with its entire surface, not a partial contact. Similarly, since the movable magnetic body 53-2 is held by the two rotary shafts 97c, the movable magnetic body 53-2 is in contact with the low-temperature-side member 51-2 with its entire surface, not a partial contact. Accordingly, efficient heat conduction is achieved.

When the movable magnetic body 53-1 is heated above the Curie point, the spontaneous magnetization diminishes and the force of attraction acting from the stationary magnet 63-1 is reduced. On the other hand, the movable magnetic body 53-2 which is in contact with the low temperature side with its entire surface still has spontaneous magnetization, and the force of attraction acting from the from the stationary magnet 63-2 on the movable magnetic body 53-2 exceeds that acting on the movable magnetic body 53-1. Consequently, as illustrated in the right part (B) of FIG. 17, the movable magnetic body 53-2 comes into contact with the high-temperature-side member 61-2. As the reflexive effect of the seesaw mechanism 50B, the movable magnetic body 53-1 comes into contact with the low-temperature-side member 51-1. The movable magnetic body 53-1 is held in a rotatable manner by the two rotary shafts 97*b*, and the movable magnetic body 53-2 is held in a rotatable manner by the two rotary shafts 97*c*. Accordingly, the movable magnetic bodies 53-1 and 53-2 move by parallel shift between the first position at which the magnetic bodies 53-1 and 53-2 come into contact with the high-temperature-side members 61-1 and 61-2, respectively, with their entire surfaces and the second position at which the movable magnetic bodies 53-1 and 53-2 come into contact with the low-temperature-side members 51-1 and 51-2, respectively, with their entire surfaces.

Figure 18:
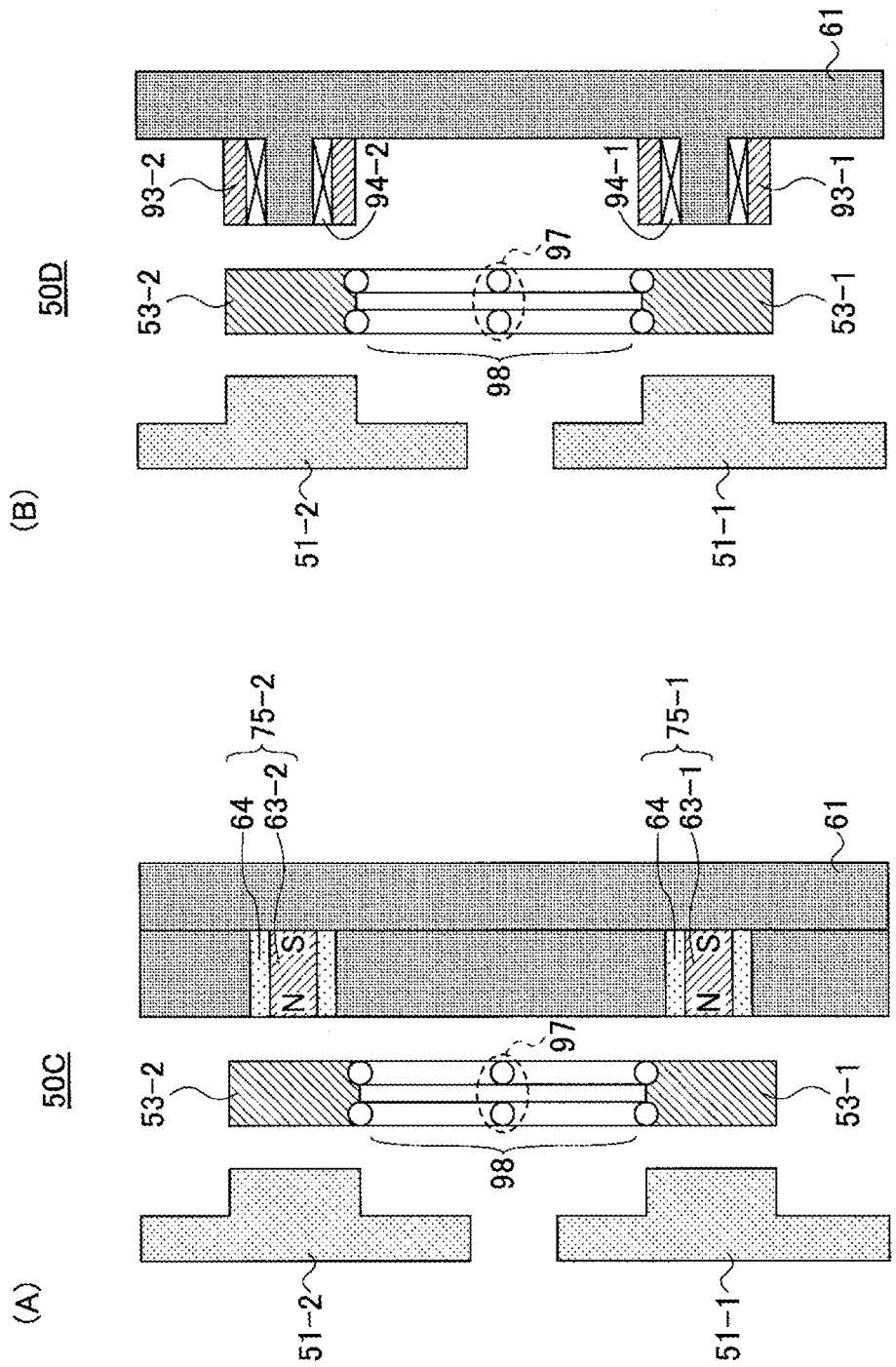
FIG. 18 illustrates another modification of the seesaw mechanism of FIG. 7.

FIG. 18 illustrates a seesaw mechanism 50*c* and a seesaw mechanism 50D, which are still other modifications of Embodiment 3. In the structure illustrated in the left part (A) of FIG. 18, a cylindrical stationary magnet 63-1 and an annular core member 64 around the stationary magnet 63-1 are embedded in the high-temperature-side member 61 to form a magnetomotive circuit 75-1. Similarly, a cylindrical stationary magnet 63-2 and an annular core member 64 around the stationary magnet 63-2 are embedded in the high-temperature-side member 61 to form a magnetomotive circuit 75-2. This arrangement enables the seesaw mechanism 50C to perform the same operation as that illustrated in FIG. 17.

In the structure illustrated in the right part (B) of FIG. 18, magnetomotive circuits are formed by arranging iron core solenoid coils 94-1 and 94-2 in the ring magnets 93-1 and 93-2, respectively. The coils 94-1 and 94-2 are arranged such that the magnetic fluxes generated in magnetic circuits pass through them. When the seesaw mechanism 50D starts operating due to a temperature difference, the magnetic flux densities penetrating through the coils 94-1 and 94-2 increase or decrease, so that electromotive forces are produced at both ends of the coils 94-1 and 94-2. The electromotive forces can be utilized as electric power. Alternatively, when the heat source is in the idle state where a sufficient amount of heat has not been generated, electric currents may be supplied to the coils 84-1 and 94-2 so as to produce magnetic fluxes in directions opposite to those generated by the permanent magnets. This arrangement provides electric power to drive the movable micro-mechanism.

Figure 19A:
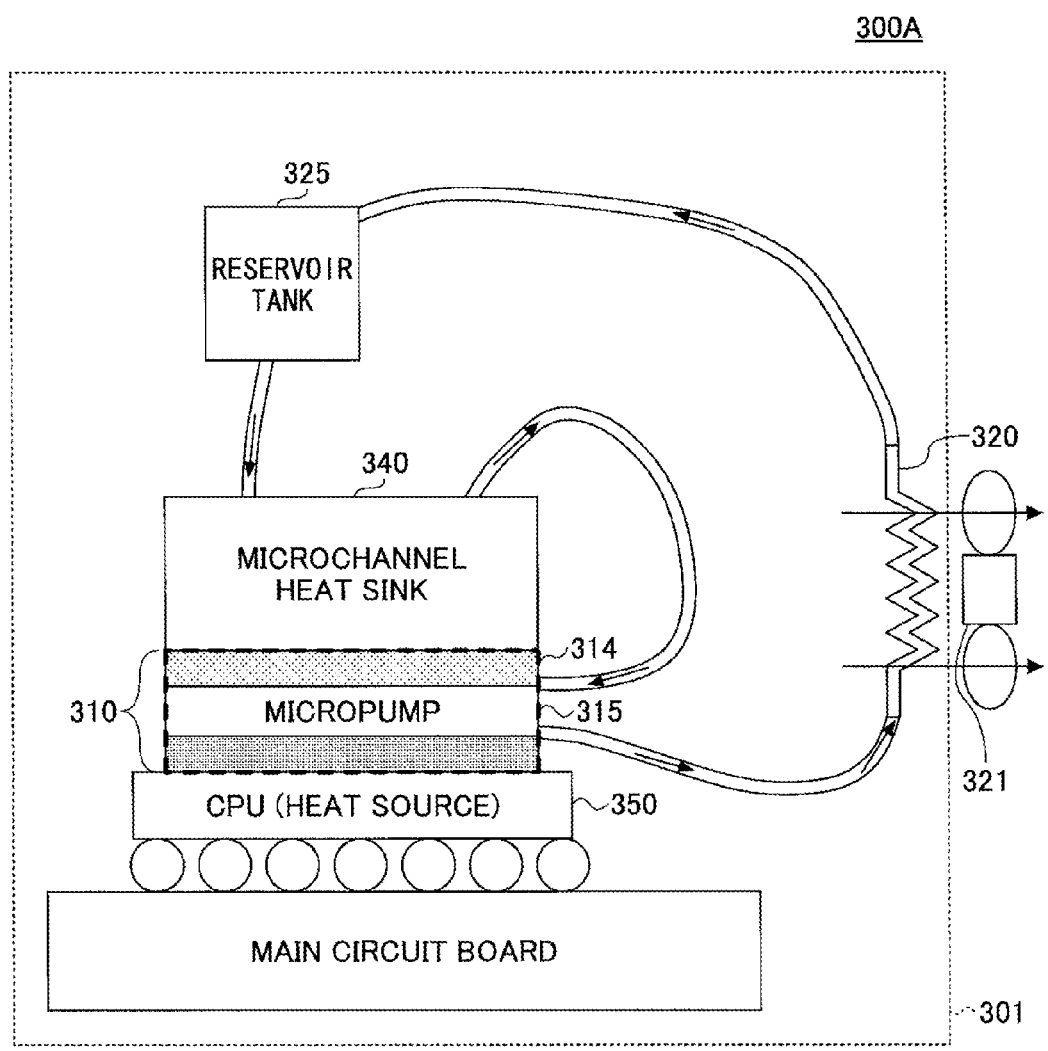
FIG. 19A illustrates an example how the micropump of the first embodiment or the second embodiment is used.
Figure 19B:
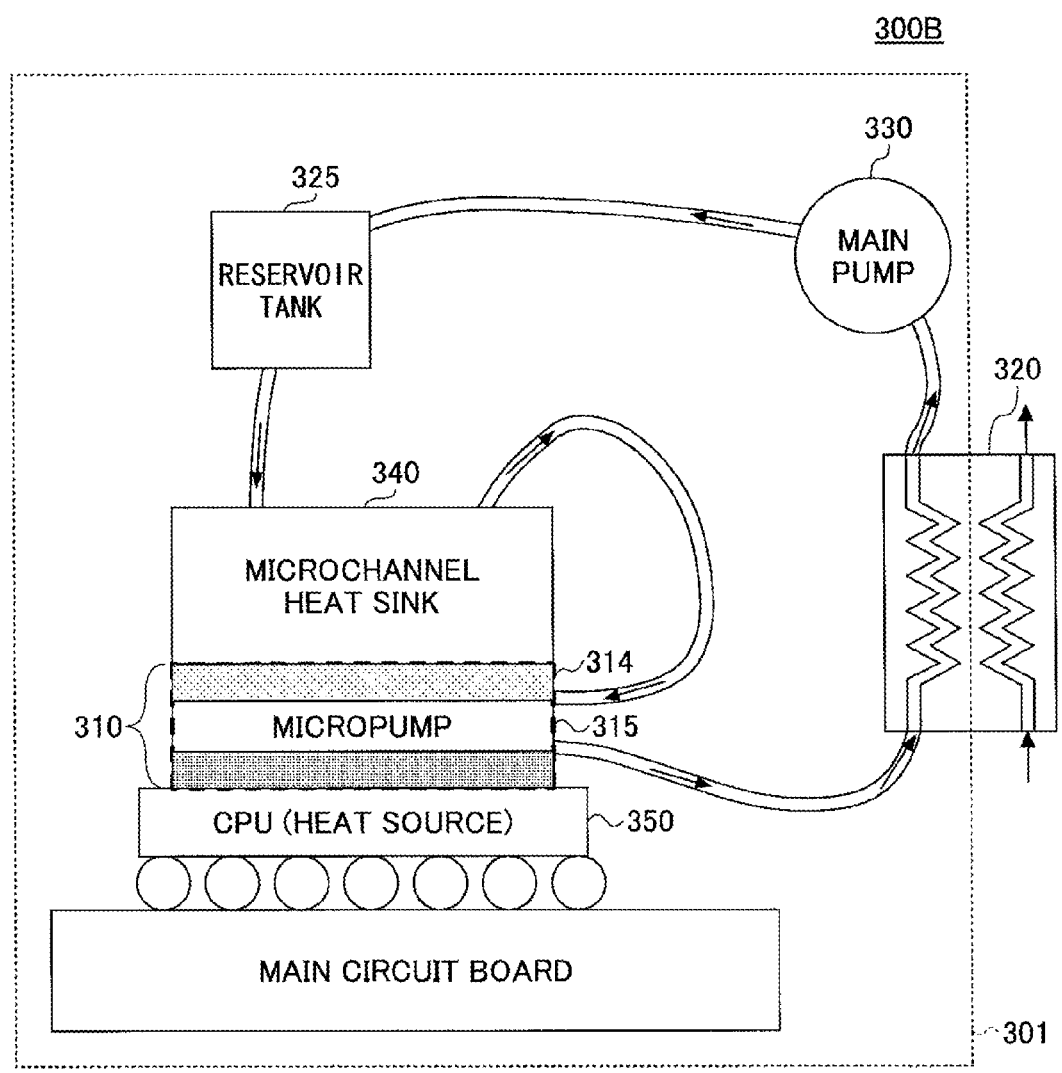
FIG. 19B illustrates another example how the micropump of the first embodiment or the second embodiment is used.

FIG. 19A and FIG. 19B illustrate sets of electronic equipment which are applications of the micropump. In these examples, the micropump 310 is used as a part of the electronic equipment 300A and the electronic equipment 300B. The micropump 310 is placed in a housing 301 such as a PC housing or a server rack, together with electronic components, to cool a heat source. The micropump 310 may be any one of micropumps of Embodiments 1, 2 and 3.

In the electronic equipment 300A of FIG. 19A, the micropump 310 is employed as a main pump. In a single CPU configuration in a stand-alone PC or the like, the micropump 310 can be used as a main pump. In this case, the micropump 310 autonomously operates according to the utilization of the CPU 350 and the flow rate of the coolant can be increased without supplying electric power.

In the electronic equipment 300B of FIG. 19B, multiple CPUs 310 are cooled in a rack server (although a single CPU is illustrated for the convenience of illustration). In this case, a main pump 330 is added and the micropump 310 is used as a secondary pump (or an auxiliary pump). The micropump 310 autonomously operates and the flow rate of the coolant can be increased according to the utilization of the CPU 350. With this structure, electric power of the main pump 330 can be reduced.

In FIG. 19A and FIG. 19B, when the micropump 310 operates making use of the temperature difference between a heat source (an electronic component such as CPU 350) and a water jacket (or a microchannel heat sink) 340, the refrigerant circulates in the system as indicated by the arrows in the figures.

In FIG. 19A, the refrigerant discharged from an outlet 315 of the micropump 310 flows through a combination of a heat exchanger (or a radiator) 320 and an electric fan 321, and a reservoir tank 325, and gets into the water jacket (microchannel heat sink) 340. The refrigerant absorbs heat transferred from the micropump 310 and flows into an inlet 314 of the micropump 310. Then, the refrigerant is discharged from the outlet 315 making use of the temperature difference between the heat source 350 and the water jacket 340. The heat exchanger 320 is a device to transfer the heat received from the heat source to a secondary refrigerant. If the secondary refrigerant is the air, the heat exchange 320 is a radiator 320.

In FIG. 19B, the refrigerant discharged from the main pump 330 flows through the reservoir tank 325 into the water jacket 340, absorbs heat transferred from the micropump 310, and flows into the inlet 314 of the micropump 310. When the micropump 310 operates making use of the temperature difference between the heat source 350 and the water jacket 340, the fluid is discharged from the outlet 315, and circulates through the heat exchanger 320 to the main pump 330.

Without the micropump, the main pump 330 pressurizes and circulates the fluid taking into account all the pressure losses in the water jacket 320, the pipes in the circulation path, and the heat exchanger 320. Accordingly, in this case, a high pressure is produced. Besides, the pipe between the main pump 330 and the water jacket 340 produces a high positive pressure, and high reliability is needed for the joint. It may be considered to reduce electric power consumption of the pump by controlling the flow rate of the fluid, or increase the exchange rate of the heat exchanger 320 by raising the temperature of the fluid discharged. However, these countermeasures cannot be realized because a risk of causing counter flow of heat from the water jacket 340 back to the heat source 350 is high and because highly accurate pump control is required.

In the present Embodiment, the micropump 310 serves a function of pumping the fluid out of the water jacket 340. During the operations of the micropump 310, the main pump 330 produces a pressure required only for the flow path from the main pump 330 to the water jacket 340 and to cover a pressure loss in the water jacket 340. By using the micropum 310 as an auxiliary pump, the pressure rising points are distributed overall and the reliability of the fluid circulation system is improved. By providing the micropump 310 near the water jacket 340 which causes the greatest pressure loss in the cooling channel, the water pressure in the pipe of the channel is reduced and risk of water leakage accidents can be decreased.

During non-operation of the micropump 310, the main pump 330 covers the pressure loss of the entire channels and the flow rate decreases to around ½ to ⅓ in rough estimation. However, in this situation the amount of heat generated from the heat source 350 is inherently small, and decline in the cooling ability is preferable. Moreover, in the micropump 310, heat is transferred from the heat source 350 to the water jacket 340 in one way, preventing reverse flow of heat. Accordingly, electric power consumption of the pump is reduced compared with the conventional techniques.

As illustrated above, in any of the Embodiments, changes in the magnetic force around the Curie point of the movable magnetic body is utilized to produce motive power to drive the movable magnetic body arranged in the interface between the low temperature side (cooling side) and the high temperature side (heat source side). The movable magnetic body is driven between the first position for contact with the high temperature side and the second position for contact with the low temperature side. By providing a restoring means to restore the movable magnetic body which has been subjected to positional shift due to the change in the magnetic permeability back to the original position, reciprocal motion is realized, serving as a pump or a switch operating without power supply.

When used as a pump, a diaphragm is provided to the movable magnetic body to cause the diagraph move up and down in the chamber according to the motion of the movable magnetic body. If a seesaw mechanism is used as a position restoring means as in Embodiments 2 and 3, one of the movable magnetic bodies is attracted to the high temperature side to increase the pressure in the corresponding chamber, and the other movable magnetic body is in contact with the low temperature side to generate a negative pressure in the corresponding chamber. With this configuration, the refrigerant is circulated efficiently.

The structures of Embodiments 1-3 may be combined with each other. For example, the stationary magnet provided on the high temperature side in Embodiments 1 and 2 may replaced with a ring magnet in which a iron core solenoid coil may be provided.

The above-described structures are applicable to a switch, an actuator, and a cooling system for cooling a heat source, especially to a cooling system for cooling an electronic device in which electronic components are packaged.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An actuator comprising:
   a first part having a pair of magnetomotive elements and configured to absorb heat up to at least a first temperature;
   a second part arranged so as to face the first part;
   a pair of temperature-sensitive magnetic bodies provided between the first part and the second part, each of said pair of temperature-sensitive magnetic bodies being configured to move between the first part and the second part such that one of said pair of temperature-sensitive magnetic bodies comes into contact with the first part when the other of said pair of temperature-sensitive magnetic bodies comes into contact with the second part, each of said temperature-sensitive magnetic bodies having a Curie point lower than the first temperature and higher than a temperature of the second part; and
   a restoring part configured to restore each of said pair of temperature-sensitive magnetic bodies from a first position in contact with the first part to a second position in contact with the second part, the restoring part being a seesaw mechanism that has a support link to hold said pair of temperature-sensitive magnetic bodies at respective ends and a fulcrum to support the support link in a rotatable manner.

2. The actuator according to claim 1, wherein a restoring force of the restoring part is greater than a force of attraction between each of said pair of magnetomotive elements and corresponding one of said pair of temperature-sensitive magnetic bodies at the first position.

3. The actuator according to claim 2, wherein the restoring force of the restoring part is smaller than the force of attraction between each of said pair of magnetomotive elements and corresponding one of said pair of temperature-sensitive magnetic bodies at the second position.

4. The actuator according to claim 1, wherein each of said pair of magnetomotive elements includes a ferromagnetic body having a Curie point higher than the first temperature.

5. The actuator according to claim 1,
   wherein the seesaw mechanism further has rotary shafts to hold said pair of temperature-sensitive magnetic bodies in a rotatable manner with respect to the ends of the support link.

6. The actuator according to claim 1,
   wherein each of said pair of temperature-sensitive magnetic bodies moves between the first position and the second position in translational motion.

7. The actuator according to claim 1,
   wherein the support link includes two links and each of said pair of temperature-sensitive magnetic bodies are held between the two links.

8. The actuator according to claim 7, wherein the seesaw mechanism further includes torsion bars to connect each of said pair of temperature-sensitive magnetic bodies to the two links.

9. The actuator according to claim 1, wherein the restoring part further has an elastic diaphragm connected to each of said pair of temperature-sensitive magnetic bodies.

10. The actuator according to claim 1, wherein each of said pair of magnetomotive elements is a stationary magnet.

11. The actuator according to claim 1, wherein each of said pair of magnetomotive elements includes a ring magnet and a coil positioned in the ring magnet.

12. The actuator according to claim 11, wherein magnetic flux penetrating through the coil increases or decreases according to a position of each of said pair of temperature-sensitive magnetic bodies moving between the first position and the second position.

13. A micropump comprising:
   an actuator having a first part having a pair of magnetomotive elements and configured to absorb heat up to at least a first temperature, a second part arranged so as to face the first part, a pair of temperature-sensitive magnetic bodies having a Curie point lower than the first temperature and higher than a temperature of the second part, each of said pair of temperature-sensitive magnetic bodies being provided between the first part and the second part and configured to move between the first part and the second part such that one of said pair of temperature-sensitive magnetic bodies comes into contact with the first part when the other of said pair of temperature-sensitive magnetic bodies comes into contact with the second part, and a restoring part configured to restore each of said pair of temperature-sensitive magnetic bodies from a first position in contact with the first part to a second position in contact with the second part, the restoring part being a seesaw mechanism that has a support link to hold said pair of the temperature-sensitive magnetic bodies at respective ends and a fulcrum to support the support link in a rotatable manner;

a chamber forming a channel between the first part and the second part of the actuator; and a diaphragm coupled to each of said pair of temperature-sensitive magnetic bodies and displaced in the chamber;

wherein when each of said pair of temperature-sensitive magnetic bodies moves from the second position to the first position, the diaphragm increases a pressure in a corresponding part of the chamber, while when each of said pair of temperature-sensitive magnetic bodies moves from the first position to the second position, the diaphragm decreases the pressure in the corresponding part of the chamber.

14. The micropump according to claim 13, further comprising:

a first valve for introducing a fluid into the chamber and a second valve for discharging the fluid from the chamber, wherein the first valve, the second valve and the diaphragm are formed monolithically.

15. The micropump according to claim 14, wherein at least a portion of the diaphragm is made of a semiconductor material.

16. Electronic equipment comprising:

a micropump according to claim 13;

an electronic component arranged so as to be in contact with the actuator of the micropump; and a circulation system connected to the micropump and configured to circulate the fluid.

17. The electronic equipment according to claim 16, further comprising:

a main pump connected to the circulation system.

* * * * *